(12) United States Patent
Early et al.

(10) Patent No.: US 10,810,330 B2
(45) Date of Patent: Oct. 20, 2020

(54) INTEGRATED MODELING AND SIMULATION OF FORMATION AND WELL PERFORMANCE

(71) Applicants: Rob Early, Spring, TX (US); Oktay Metin Gokdemir, Katy, TX (US); Christopher J. Freitas, San Antonio, TX (US); Nathan F. Andrews, San Antonio, TX (US); Nicholas J. Mueschke, San Antonio, TX (US); Rhandy Regulacion, Al Khobar (SA)

(72) Inventors: Rob Early, Spring, TX (US); Oktay Metin Gokdemir, Katy, TX (US); Christopher J. Freitas, San Antonio, TX (US); Nathan F. Andrews, San Antonio, TX (US); Nicholas J. Mueschke, San Antonio, TX (US); Rhandy Regulacion, Al Khobar (SA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 622 days.

(21) Appl. No.: 15/381,345

(22) Filed: Dec. 16, 2016

(65) Prior Publication Data

US 2017/0177761 A1    Jun. 22, 2017

Related U.S. Application Data

(60) Provisional application No. 62/269,713, filed on Dec. 18, 2015.

(51) Int. Cl.
*G06F 30/20* (2020.01)
*E21B 41/00* (2006.01)
(Continued)

(52) U.S. Cl.
CPC .......... *G06F 30/20* (2020.01); *E21B 41/0092* (2013.01); *E21B 47/00* (2013.01);
(Continued)

(58) Field of Classification Search
CPC ........ E21B 41/00; E21B 43/00; E21B 47/022; E21B 43/26; G01V 99/005; G06N 7/005
See application file for complete search history.

(56) References Cited

U.S. PATENT DOCUMENTS 7,963,327 B1    6/2011   Saleri et al.
8,463,585 B2    6/2013   Sun et al.
(Continued)

FOREIGN PATENT DOCUMENTS

WO    2010090825 A2    8/2010
WO    2015077581 A1    5/2015
WO    2015138724 A1    9/2015

OTHER PUBLICATIONS

International Search Report, and the Written Opinion of the International Searching Authority, or the Declaration; PCT/US2016/066951, dated Apr. 10, 2017; 16 pages.

(Continued)

*Primary Examiner* — Kandasamy Thangavelu
(74) *Attorney, Agent, or Firm* — Cantor Colburn LLP

(57) ABSTRACT

A method of performing aspects of an energy industry operation includes receiving input data at a processing system, the input data describing an assembly for performing the energy industry operation and properties of the formation, the assembly including a downhole component, the processing system configured to estimate production properties based on mathematical models including at least a model of the downhole component and one or more models for simulating fluid flow in the formation. The method also includes, based on the input data, generating a
(Continued)

workflow that includes steps for estimating production properties using the models, receiving a selection from a user specifying a type of analysis to be performed and/or a level of complexity of analysis to be performed, customizing the workflow based on the user selection, estimating the production properties based on the models, where estimating is performed according to a procedure specified by the workflow.

19 Claims, 42 Drawing Sheets

(51) Int. Cl.
  *E21B 47/00* (2012.01)
  *E21B 49/08* (2006.01)
  *G06F 111/10* (2020.01)

(52) U.S. Cl.
  CPC .......... *E21B 49/08* (2013.01); *E21B 49/0875* (2020.05); *G06F 2111/10* (2020.01)

(56) References Cited

U.S. PATENT DOCUMENTS

| | | | |
|---|---|---|---|
| 8,676,721 B2 | 3/2014 | Piovesan et al. | |
| 8,892,412 B2 | 11/2014 | Ghayour et al. | |
| 2007/0005253 A1 | 1/2007 | Fornel et al. | |
| 2007/0294034 A1* | 12/2007 | Bratton | E21B 41/00 702/6 |
| 2011/0011595 A1* | 1/2011 | Huang | E21B 43/00 166/369 |
| 2011/0172976 A1* | 7/2011 | Budiman | E21B 47/022 703/2 |
| 2011/0186353 A1 | 8/2011 | Turner et al. | |
| 2011/0246163 A1* | 10/2011 | Dale | E21B 43/00 703/10 |
| 2013/0140031 A1* | 6/2013 | Cohen | E21B 43/26 166/308.1 |
| 2014/0324521 A1 | 10/2014 | Mun | |
| 2014/0376710 A1 | 12/2014 | Shaffer et al. | |
| 2016/0164732 A1 | 6/2016 | Suerbaum | |
| 2016/0187508 A1 | 6/2016 | Plost et al. | |
| 2016/0253767 A1 | 9/2016 | Langenwalter et al. | |
| 2016/0312552 A1 | 10/2016 | Early et al. | |
| 2016/0312608 A1 | 10/2016 | Brown et al. | |
| 2017/0096881 A1* | 4/2017 | Dusterhoft | G06N 7/005 |
| 2017/0160429 A1* | 6/2017 | Berard | G01V 99/005 |
| 2020/0024932 A1 | 1/2020 | Brown et al. | |

OTHER PUBLICATIONS

Mohaghegh, et al.; "Top-Down, Intelligent Reservoir Modeling of Oil and Gas Producing Shale Reservoirs; Case Studies"; INt. J, Oil, Gas and Coal Technoloigy vol. 5, No. 1, 2012; 12 pages.

Vera, et al.; "Describing Shall Well Performance Using Transient Well Analysis"; May 2014; Retrieved from the internet; URL: http//www.spe.org/enprint-article/?art=537, 5 pages.

Oil States, Oil States Industries, Inc.; "Repair and Maintenance—Subsea and Surface Equipment"; 2017, 6 Pages.

Sahdev, Mukesh; Centrifugal Pumps: Basic Concepts of Operation, Maintenance, and Troubleshooting (Part-1); 2010.

Von Flatern, Rick; Well Intervention—Maintenance and Repari; 2014.

* cited by examiner

ICD Completion Design Optimization

| Time Dependent Optimization Objective Function | | | |
|---|---|---|---|
| ○ None Snapshot Well Performance | | | |
| ○ Maximize Ultimate Recovery | | | |
|     Minimum Acceptable Oil Production Rate | 1,000 | STB/d | |
| ⦿ Maximize Cumulative Production | | | |
|     Operating Life | 10.0 | years | |
| ○ Maximize Net Present Value | | | |
|     Operating Life | 10.0 | years | |
|     Price of Oil | 100 | $/bbl | |
| ☐ Cost of Produced Gas Treatment and Processing | 5.00 | $/ft$^3$ | |
| ☐ Cost of Produced Water Treatment and Processing | 10.00 | $/bbl | |
| ☐ Cost of ESP Electricity | 1.20 | $/kW-h | |
| ☐ Cost of GL Compression | 3.00 | $/ft$^3$ | |
| ☐ Cost of Surveillance and Frequency | 50,000.00 | $ | 0.5 year |
| ☐ Cost of Servicing and Frequency | 300,000.00 | $ | 3.0 year |

Constraints

| Design and Operations | | | |
|---|---|---|---|
| ☑ Maximum Allowable Liquid Production Rate | 25,000 | STB/d | |
| ☑ Maximum Allowable Water Production Rate | 20,000 | STB/d | |
| ☑ Maximum Allowable Gas Production Rate | 500 | MSCF/d | |
| ☑ Maximum Allowable Wellhead Temperature | 200 | °F | |
| ☐ Maximum Allowable Temperature at Depth | 300 | °F | 6,500 ft MD |
| ☑ Maximum Allowable dP Across ICDs | 1,000 | psi | |
| ☑ Minimum Allowable Flowing Wellhead Pressure | 260 | psi | |

| Reservoir Managment | | | |
|---|---|---|---|
| ☑ Maximum Allowable Drawdown | 400 | psi | |
| ☑ Minimum Allowable Flowing Bottom Hole Pressure | | | |
|     ⦿ Bubble Point Pressure | | | |
|     ○ Other | 2,000 | psi | |
| ☑ Minimum Allowable Coning Time and Threshold Water Cut | 2.0 | year | 0.0 % |
| ☐ Minimum Allowable Cusping Time and Threshold GOR | 2.0 | year | |
|     ⦿ dissolved GOR | | | |
|     ○ Other | 2,000 | SCF/STB | |

| Sand Production and Erosion Management | | |
|---|---|---|
| ⦿ Maximum Allowable Sand Production Rate | 2,500 | lb/d |
| ○ Maximum Allowable Sand Concentration | 0.10 | lb/STB |
| ○ Maximum Allowable Velocity of Erosion | 0.50 | ft/sec |

FIG.22

Multi-Node Completion Design Optimization

Time Dependent Optimization Objective Function
- ○ None Snapshot Well Performance
- ○ Maximize Ultimate Recovery
  - Minimum Acceptable Oil Production Rate  [1,000] STB/d
- ● Maximize Cumulative Production
  - Operating Life  [10.0] years
- ○ Maximize Net Present Value
  - Operating Life  [10.0] years
  - Price of Oil  [100] $/bbl
  - ☐ Cost of Produced Gas Treatment and Processing  [5.00] $/ft$^3$
  - ☐ Cost of Produced Water Treatment and Processing  [10.00] $/bbl
  - ☐ Cost of ESP Electricity  [1.20] $/kW-h
  - ☐ Cost of GL Compression  [3.00] $/ft$^3$
  - ☐ Cost of Surveillance and Frequency  [50,000.00] $  [0.5] year
  - ☐ Cost of Servicing and Frequency  [300,000.00] $  [3.0] year

Constraints

Design and Operations
- ☑ Maximum Allowable Liquid Production Rate  [25,000] STB/d
  - Zonal Maximum Allowable Liquid Offtake Rates
- ☑ Minimum Allowable Well Water Production Rate  [20,000] STB/d
- ☑ Maximum Allowable Gas Production Rate  [500] MSCF/d
- ☑ Maximum Allowable Wellhead Temperature  [200] °F
- ☐ Maximum Allowable Temperature at Depth  [300] °F  [6,500] ft MD
- ☐ Maximum Allowable CO$_2$ Partial Pressure  [200] psi
- ☐ Maximum Allowable H$_2$S Partial Pressure  [200] psi
- ☑ Minimum Allowable dP Across ICVs
  - Shut-In  [7,500] psi
  - Production Mode  [5,000] psi
  - Injection Mode  [2,000] psi
  - Frequency of ICV-Manipulation  [12] month
- ☐ Maximum Allowable Flowing Wellhead Pressure  [260] psi Continued on FIG.23B

FIG.23A

Continued
from FIG.23A

| Reservoir Managment | | |
|---|---|---|
| ☑ Crossflow Not Allowable | | |
| ☑ Minimum Allowable Drawdown | 400 | psi |
| ☑ Minimum Allowable Flowing Bottom Hole Pressure | | |
| ⦿ Bubble Point Pressure | | |
| ○ Other | 2,000 | psi |
| ☑ Minimum Allowable Coning Time and Threshold Water Cut | 2.0 year | 0.0 % |
| ☐ Minimum Allowable Cusping Time and Threshold GOR | 2.0 | year |
| ⦿ dissolved GOR | | |
| ○ Other | 2,000 | SCF/STB |
| Sand Production and Erosion Management | | |
| ⦿ Maximum Allowable Sand Production Rate | 2,500 | lb/d |
| ○ Maximum Allowable Sand Concentration | 0.10 | lb/STB |
| ○ Maximum Allowable Velocity of Erosion | 0.50 | ft/sec |

FIG.23B

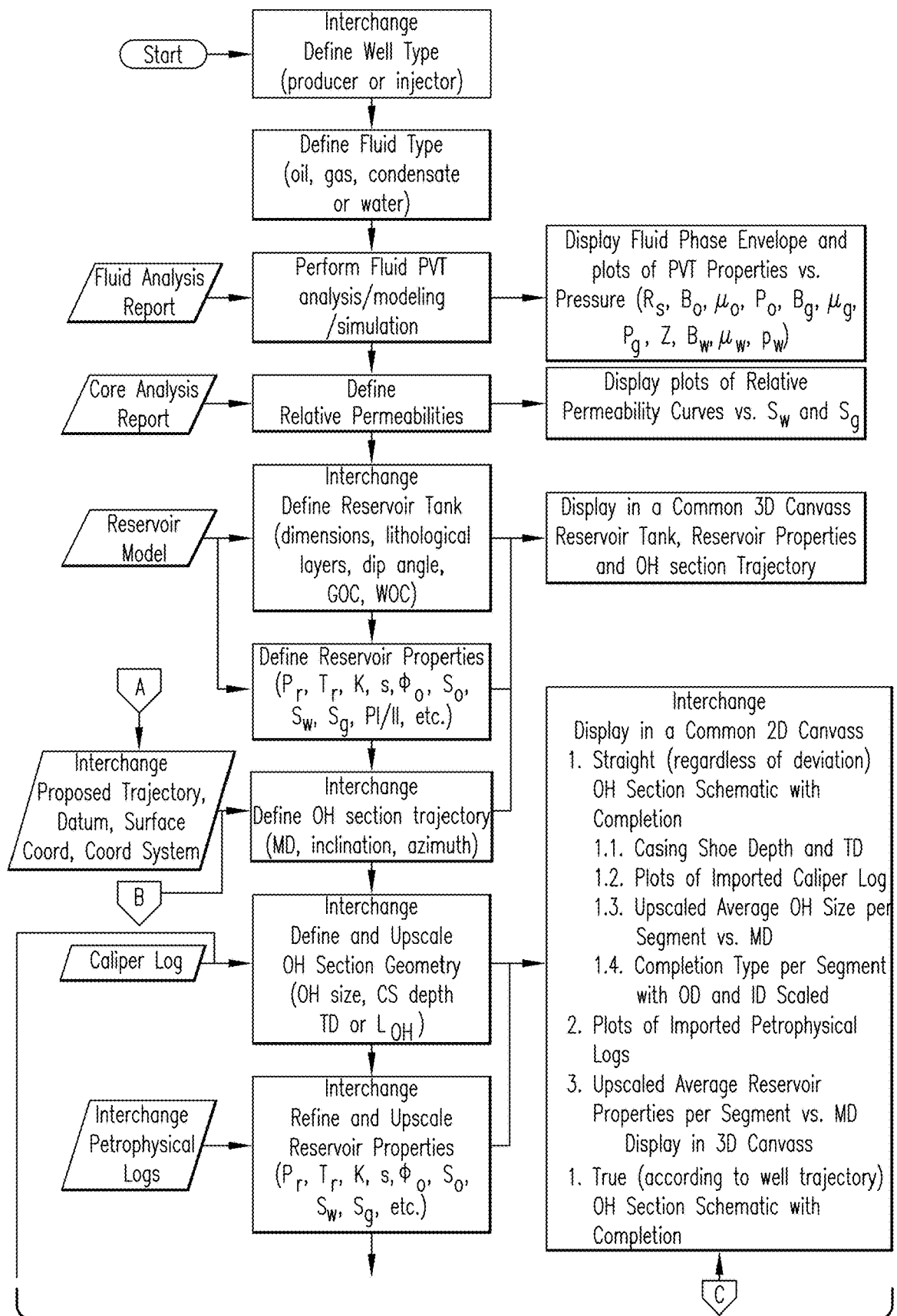
FIG.29A  Continued on FIG.29B

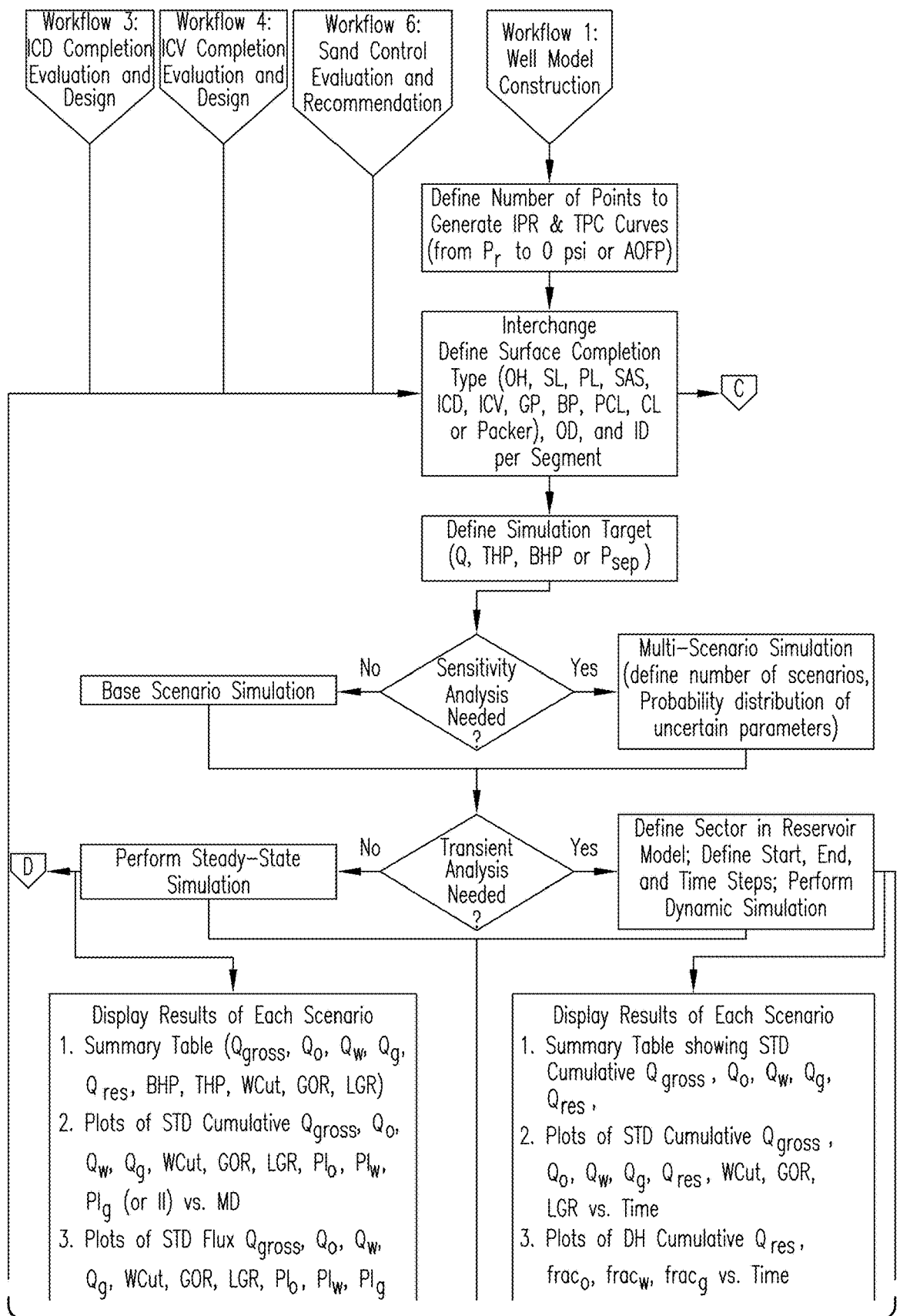
FIG.30A  Continued on FIG.30B

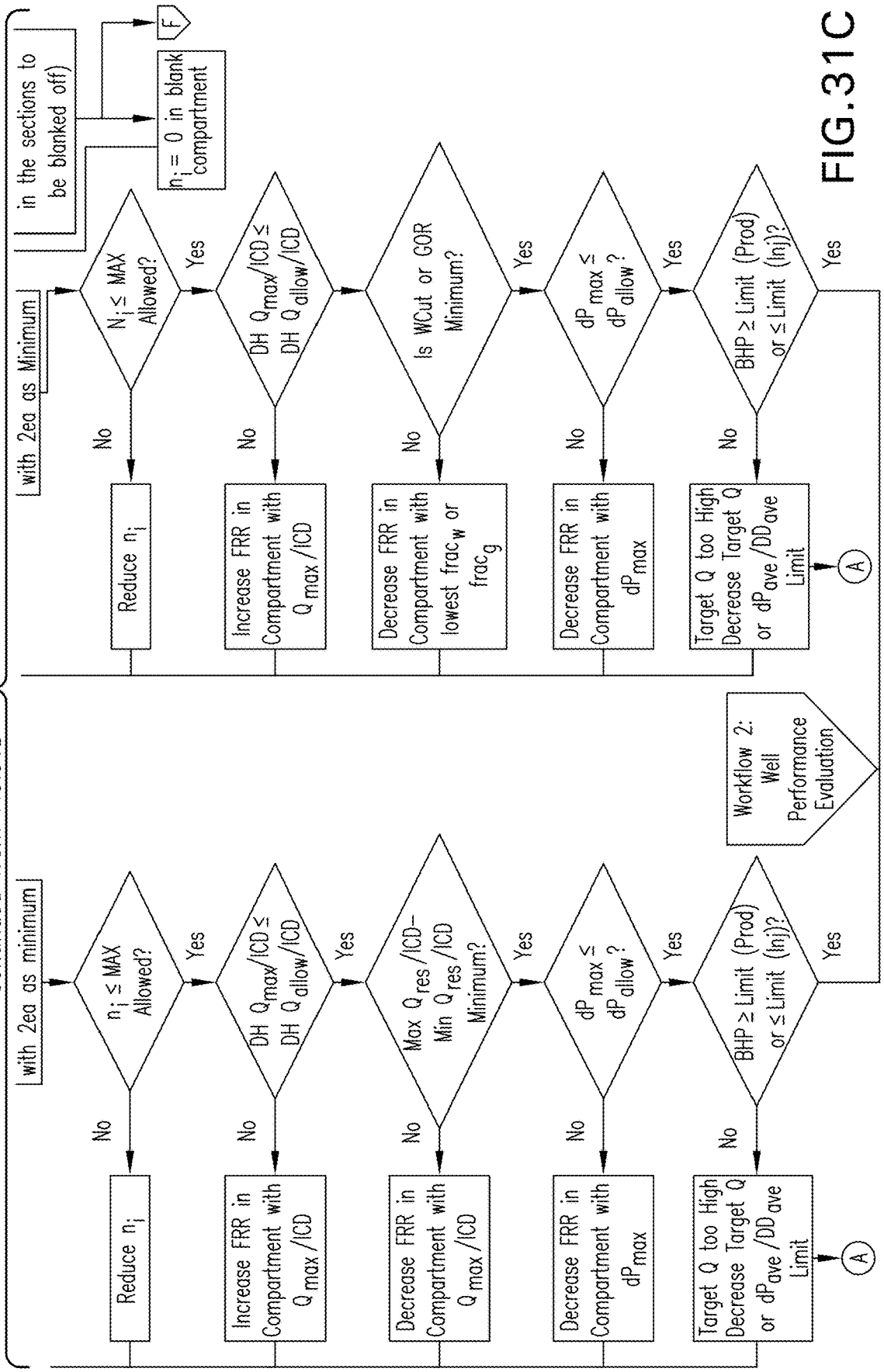

INTEGRATED MODELING AND SIMULATION OF FORMATION AND WELL PERFORMANCE

CROSS REFERENCE TO RELATED APPLICATIONS

This application claims the benefit of an earlier filing date from U.S. Provisional Application Ser. No. 62/269,713 filed Dec. 18, 2015, the entire disclosure of which is incorporated herein by reference.

BACKGROUND

Oil and gas resources are becoming more challenging and expensive to develop. This challenge can be best demonstrated in the deepwater developments around the world (e.g., Gulf of Mexico, West Africa, and Brazil) where the high cost environment and pressures on cycle time and reservoir complexity have resulted in more reservoir characterization uncertainty being carried over in to the development phase. Operators are seeking more efficient work practices and enhanced analysis techniques to provide greater assurance that reservoir and well performance ranges are fully described and characterized and that risks can be mitigated.

SUMMARY

An embodiment of a method of performing aspects of an energy industry operation includes receiving input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation. The method also includes, based on the input data, generating a workflow that includes steps for estimating production properties using the models, receiving a selection from a user specifying at least one of a type of analysis to be performed and a level of complexity of analysis to be performed, customizing the workflow based on the user selection, estimating the production properties based on the models, where estimating is performed according to a procedure specified by the workflow, and adjusting at least one of an operational parameter of the energy industry operation and a design parameter of the downhole component based on the production properties.

A embodiment of a system for performing aspects of an energy industry operation includes an input module configured to receive input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation. The system also includes an analysis module configured to generating a workflow based on the input data, the workflow including steps for estimating production properties using the models, the analysis module configured to receive a selection from a user specifying at least one of a type of analysis to be performed and a level of complexity of analysis to be performed, and customize the workflow based on the user selection. The system further includes and a simulation module configured to estimate the production properties based on the models, wherein estimating is performed according to a procedure specified by the workflow.

BRIEF DESCRIPTION OF THE DRAWINGS

The following descriptions should not be considered limiting in any way. With reference to the accompanying drawings, like elements are numbered alike:

FIG. 22, and FIGS. 23A and 23B (collectively referred to as "FIG. 23"), depict an example of a component of an interface for inputting optimization parameters;

FIGS. 29A and 29B (collectively referred to as "FIG. 29") depict examples of workflows for performing simulation, modeling and component design optimization;

FIGS. 30A-30C (collectively referred to as "FIG. 30") depict examples of workflows for performing simulation, modeling and component design optimization;

FIGS. 31A-31C (collectively referred to as "FIG. 31") depict examples of workflows for performing simulation, modeling and component design optimization.

DETAILED DESCRIPTION

Figure 1:
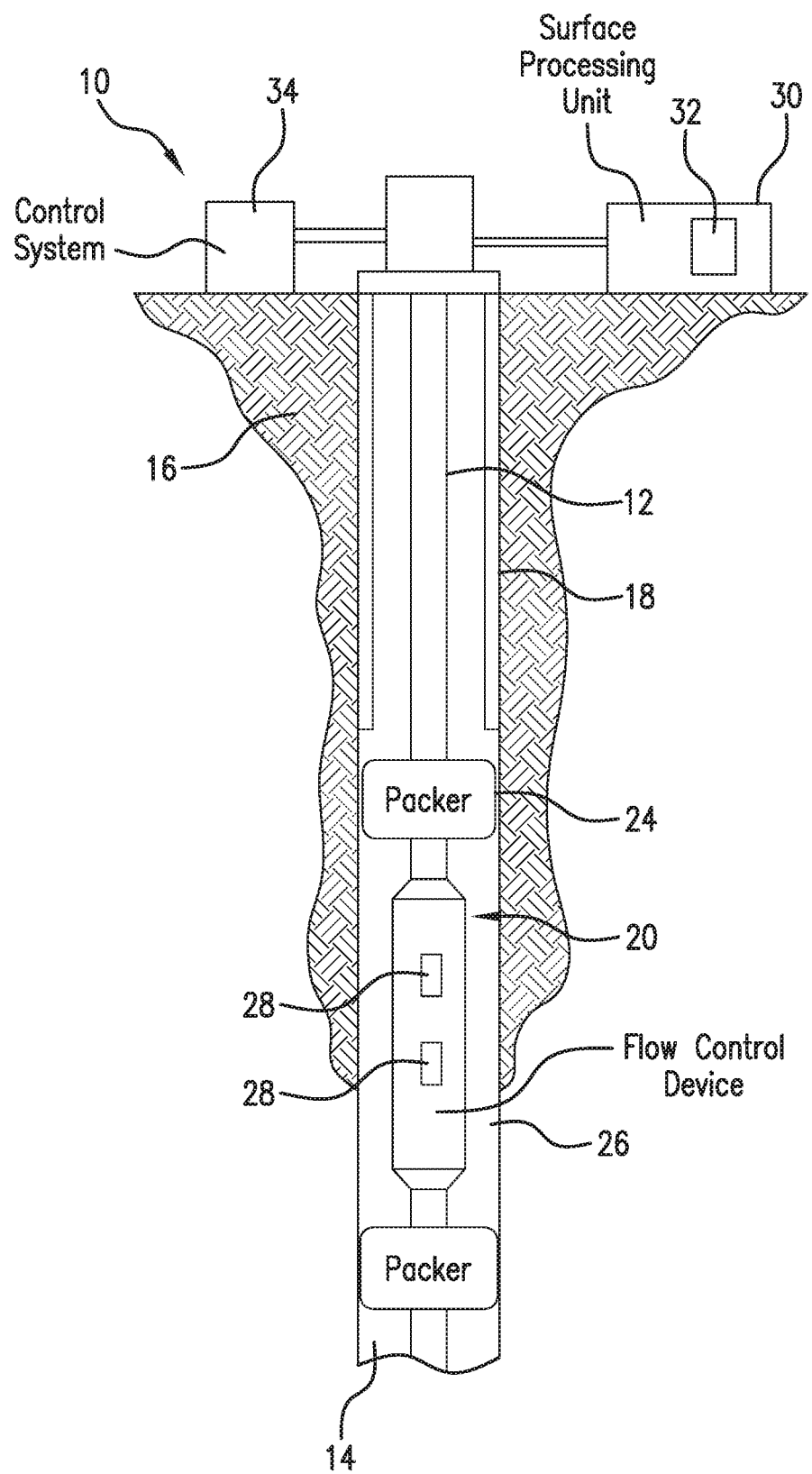
FIG. 1 depicts an embodiment of a hydrocarbon production system.

Systems and methods are described herein that provide for simulation, modeling and evaluation of a downhole environment. An embodiment of a processing system includes an integrated suite of programs and/or processing modules for modeling and simulation of various aspects of a downhole environment, including modeling downhole components such as completion hardware, modeling multi-phase inflow performance and other aspects of development, performing uncertainty analysis and performing optimization analysis. The systems and methods are applicable to a variety of energy industry systems, such as production wells and injection wells.

Embodiments described herein address current model shortcomings and allow production engineers and other users to model and predict complex nonlinear near wellbore inflow performance with greater rigour and fidelity to provide improved confidence in performance predictions, supporting product sales, engineering design decisions and operational analysis.

In one embodiment, an integrated processing system is provided that allows a user to access and interface a variety of simulation and analysis modules, including, for example, a near wellbore inflow performance model, a local wellbore simulator, an extended wellbore simulator, a flow control device simulator, an analytical modeling module, an uncertainty assessment module and/or an optimization module. The system may be used to execute predictive methodologies based on sets of mathematical models and solution methods which allow for investigating and analyzing through computational simulation the near wellbore region and its characteristics as a function of time and space, and allow for designing and assessing well performance and predicting future operational states. The associated methods and the associated resulting software are applicable to a range of completion types, fluid characteristics, reservoir characteristics, and well operational states. These models and methods may be incorporated into a functional design tool which can be specific to each subsurface environment and conditions, and can aid completion/production engineers during completion design, evaluation, and operation assessments and evaluations.

In one embodiment, the system is workflow driven system providing an integrated approach aligned with the completion design process, taking into account various considerations such as reservoir performance risks, data uncertainties, equipment selection and life of well performance expectations and costs to optimization design decisions and establish safe operating guidelines. Integrated workflows are provided that can provide options and/or guide a user through various processes, such as near wellbore modeling, borehole modeling, completion design and/or other component modeling, optimization of hardware design and/or operational parameters.

In one embodiment, the system is configured to generate, store and/or present a variety of hierarchical workflows that can be accessed, selected, customized and/or created by a user. The workflows are used by the system and/or a user to execute a hierarchical methodology that includes generating analytical or semi-analytical engineering models that may be applied for quick assessments, and includes more detailed models that the ability to perform multi-dimensional simulations. Such simulations include, for example, flow modeling (e.g., inflow and/or outflow), nonlinear dynamics of a flow field, sand production, transport, filtration, and reservoir failure effects. The multi-dimensional simulations provide capabilities not currently available to the practicing engineer.

Referring to FIG. 1, an exemplary embodiment of a downhole completion and/or production system 10 includes a borehole string 12 that is shown disposed in a borehole 14 that penetrates at least one earth formation 16. In this embodiment, the borehole string 12 is a production string. The borehole 14 may be an open hole or an at least partially cased hole having a casing 18, and may be generally vertical or include a deviated and/or horizontal component. A "borehole string", as used herein, refers to any structure or carrier suitable for lowering a tool through a borehole and/or connecting a tool to the surface, and is not limited to the structure and configuration described herein. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

The system 10 includes a flow control tool or device 20 for filtering or otherwise controlling flow of fluid from the formation and/or annulus into a completion or production string. In one embodiment, the flow control device 20 operates as a sand control or sand screen device. The flow control device 20 is configured to allow fluids from the formation to enter the production string, and also serves to filter or remove solids and particulates (e.g., sand) and/or other undesirable materials from the fluids prior to entering the production string. As used herein, the term "fluid" or "fluids" includes liquids, gases, hydrocarbons, multi-phase fluids, mixtures of two of more fluids, water, brine, engineered fluids such as drilling mud, fluids injected from the surface such as water, and naturally occurring fluids such as oil and gas.

The system 10 may also include one or more packers 24 for establishing a production zone 26 that is isolated from the rest of the borehole 14. Any number of production zones 26 can be established, each having one or more flow control devices 28 therein. The flow control devices 28, in one embodiment, include at least one inflow control valve that is controlled at the surface and/or at least one inflow control device (ICD) that is pre-designed to operate downhole without surface control. The flow control device may be any suitable valve, choke or other device that can regulate the flow of the fluid into the production string 12. Although the production zone 26 is shown in an open hole portion of the borehole, it is not so limited. For example, the production zone can be cased by a solid or perforated casing.

Formation fluid is produced from one or more production zones (e.g., an upper production zone and a lower production zone) that are established via the packers 24. Various components may be included in the system for facilitating production, such as perforations in the casing and screens to prevent or inhibit solids, such as sand, from entering into the borehole from production zones. The system may also include an artificial lift mechanism, such as an electrical submersible pump (ESP), a gas lift system, a beam pump, a jet pump, a hydraulic pump or a progressive cavity pump, to pump fluids to the surface.

Formation fluid from production zones enters an annulus of the borehole 14 and into the production string 12. Flow control devices 28 regulate the fluid flow into the production string 12 and may be used to adjust flow of the fluid to the surface. Each valve, choke and other such device in the well may be operated electrically, hydraulically, mechanically and/or pneumatically from the surface.

Various sensors may be placed at suitable locations in the borehole 14 and/or the production string 12 to provide measurements or information relating to downhole parameters of interest. Exemplary sensors include temperature sensors (e.g., a distributed temperature sensing (DTS) system), pressure sensors, flow measurement sensors, resistivity sensors, sensors that provide information about density, viscosity, water content or water cut, and chemical sensors. Density sensors may be fluid density measurements for fluid from each production zone and that of the combined fluid from two or more production zones. Resistivity sensors may provide measurements relating to the water content or the water cut of the fluid mixture received from each production zones. Other sensors may be used to estimate the oil/water ratio and gas/oil ratio for each production zone and for the combined fluid. The temperature, pressure and flow sensors provide measurements for the pressure, temperature and flow rate of the fluid.

For example, one or more production logging tools (PLTs) are incorporated in the production string to measure fluid properties such as flow rate, density, phase velocity, water holdup, pressure and temperature. Other sensors such as permanent downhole gauges (PDGs) may be permanently installed in the borehole to provide acoustic or seismic measurements, formation pressure and temperature measurements, resistivity measurements and measurements relating to the properties of the casing and/or formation. Sensors also may be provided at the surface, such as a sensor for measuring the water content in the received fluid, total flow rate for the received fluid, fluid pressure at the wellhead, temperature, etc. The signals from the downhole sensors may be partially or fully processed downhole (such as by a microprocessor and associated electronic circuitry that is in signal or data communication with the downhole sensors and devices) and then communicated to the surface controller via a signal/data link.

In one embodiment, various components of the system are in communication with a surface processing device or unit 30 that includes a processor 32. The surface processing system may be configured as a surface control system that controls various production and/or injection parameters, receives data from downhole and surface sensors, analyzes the data and/or displays measurement data, analysis results and/or prediction or forecasting results. The surface processing system includes components as necessary to provide for storing and/or processing data collected from various sensors therein. Exemplary components include, without limitation, at least one processor, storage, memory, input devices, output devices and the like. Any number of other surface systems or equipment may be included in the system, such as a fluid injection control system 34.

In one embodiment, the control valves or other inflow control devices and sensors are disposed downhole in a "smart" or "intelligent" well configuration. Smart well technology involves measurement and reservoir flow control features that are disposed downhole. Installation of downhole active flow control devices (multinode), inflow control valves, measurement devices (e.g., for pressure, temperature and flow rate), and/or downhole processing facilities such as hydro-cyclones in the borehole allows for active production monitoring and control. Intelligent wells facilitate control of parameters such as fluid flow and pressure, and facilitate periodically or continuously updating reservoir models during production.

Figure 2:
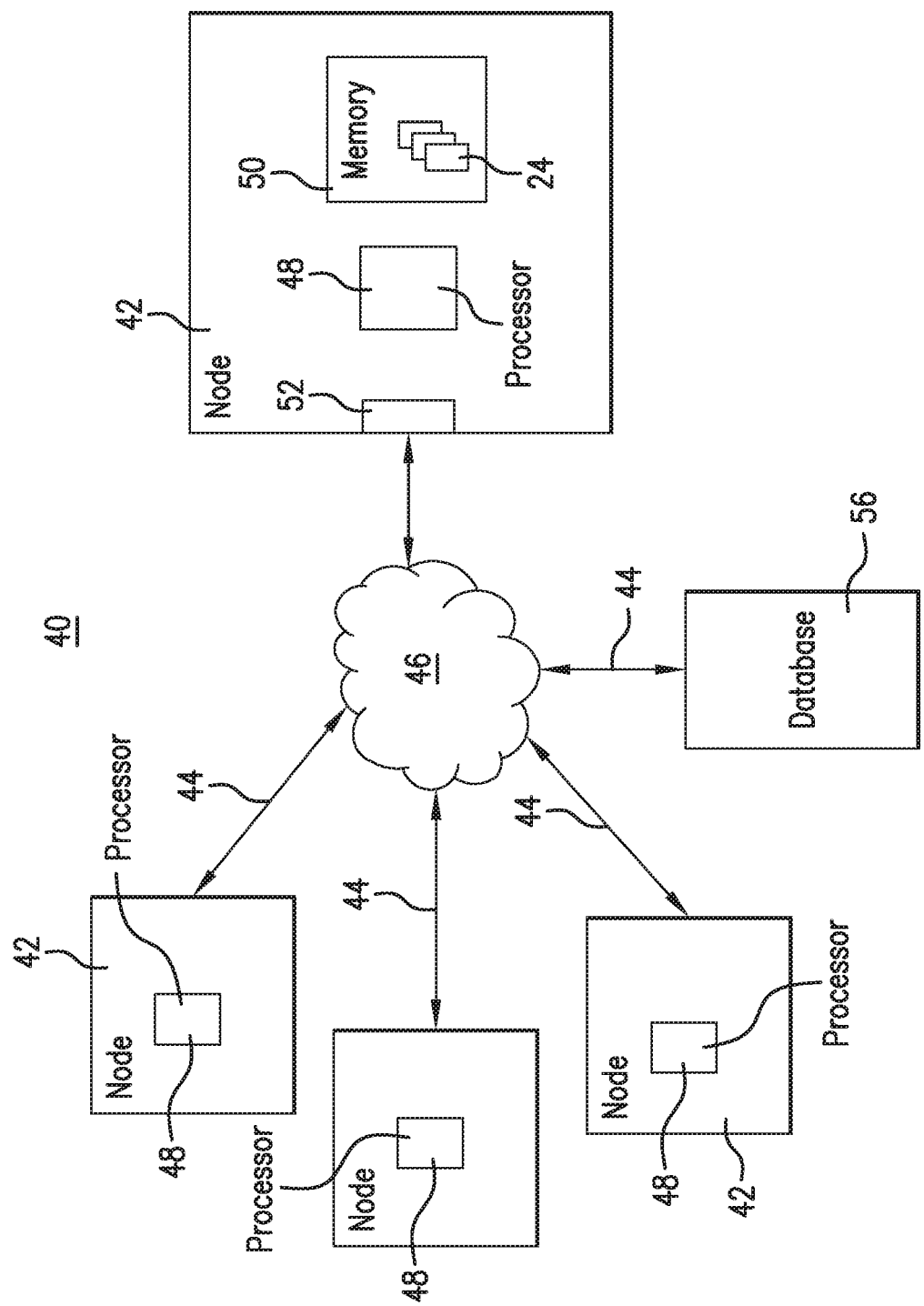
FIG. 2 depicts an embodiment of a processing system.

FIG. 2 is a block diagram of a distributed data storage, processing and communication system 40, which may be used to embody and/or perform the embodiments described herein. The system 40 includes a plurality of processing devices or nodes 42. The nodes 42 each have computing components and capabilities, are connected by links 44, which may be wired or wireless. One or more of the nodes 42 may be connected via a network 46, such as the Internet or an internal network. Each node 42 is capable of independent processing, and includes suitable components such as a processor 48, memory 50 and input/output interface(s) 52. The memory 50 stores data and programs, such as input data from a user or other processors and programs. In one embodiment, the memory 50 stores various processing or program modules 54 for performing aspects of embodiments described herein, which may be incorporated into a program suite. The nodes may be computing devices of varying size and capabilities such as server machines, desktop computers, laptops, tablets and other mobile devices.

In one embodiment, the system includes one or more data storage locations. For example, the system 40 includes a node configured as a database 56. In one embodiment, one or more of the nodes 12 is a host that stores data and communicates with one or more nodes 12 as clients. For example, one or more of the processing devices 42 includes a server that acts as a host computer or host storage device and performs data management and data services functions. An exemplary client/server system or network includes an energy industry data storage and sharing network that is accessible by multiple client devices that can send data to one or more data repositories and retrieve data stored in one or more data repositories.

A processing system, such as the surface processing unit 30, the system 40 and/or the processing device(s) 42, incorporates an integrated suite or system of processing modules or programs that provide various modeling, simulation and analysis services. The system provides methodologies and simulation and/or analysis tools for simulation and analysis of the near wellbore environment. The near wellbore environment may include a borehole or portions thereof (e.g., production zones), downhole components deployed in the borehole, and a volume of a formation around the borehole. The system allows for multi-dimensional representation of the physical structure of the near wellbore environment accounting for, e.g., reservoir variability, fracture tunnels, wellbore configuration and hardware, fluid characteristics and properties, and characteristics and transport of sands/particles. In addition to the simulation of the physics or mechanics of wellbore functional dynamics, a probabilistic capability may also be incorporated to allow for assessment of uncertainties, variabilities, and sensitivities. Models and computational tools have broad applicability to different downhole configurations (e.g., completion types) and reservoir characteristics spanning from unconsolidated or semi-consolidated rock to hard rock. The system also allows for the addition of new models for different applications or physical processes to be easily incorporated into the system and address the evolving needs or requirements of clients.

There was, and still is, an industry technology gap for advanced predictive methodologies for the design, analysis, and assessment of near wellbore performance. The near wellbore environment is characterized by large pressure drop (drawdown), high fluid velocities, multiphase fluids, widely varying permeability, unconsolidated and damaged reservoir formation, transient formation loads (stresses), and sand transport and filtration (trapping). When designing or analysing specific completions a completions engineer will typically use a variety of independent, simplified semi-analytical tools to predict the characteristics of the well. Unfortunately, these simplified analytic models are typically insufficient to predict the multi-scale (spatial and temporal) inflow characteristics of the well and reservoir structural performance in the near wellbore region. The use of these tools for design and analysis generally leads to overly simplistic analyses of what is a complex nonlinear problem, and often results in poor business decisions due to the inadequate prediction of outcomes and uncertainty ranges.

Embodiments described herein address such insufficiencies by providing predictive methodologies based on mathematical models and solution methods for the near wellbore region that integrates into a single approach the disparate length and time scales of this problem for use by, e.g., completion/production engineers. The predictive methodologies, in one embodiment, are based on sets of mathematical models and solution methods which allow for (1) investigating and analyzing through computational simulation the near wellbore region and its characteristics as a function of time and space and (2) allow for designing and assessing well performance and predicting future operational states. The model forms and methods and the associated resulting software are applicable to a range of completion types, fluid characteristics, reservoir characteristics, and well operational states. These models and methods allow for development of a functional design tool ultimately specific to each subsurface environment and conditions and capable of aiding completion/production engineers during completion design, evaluation, and operation assessments and evaluations.

Figure 3:
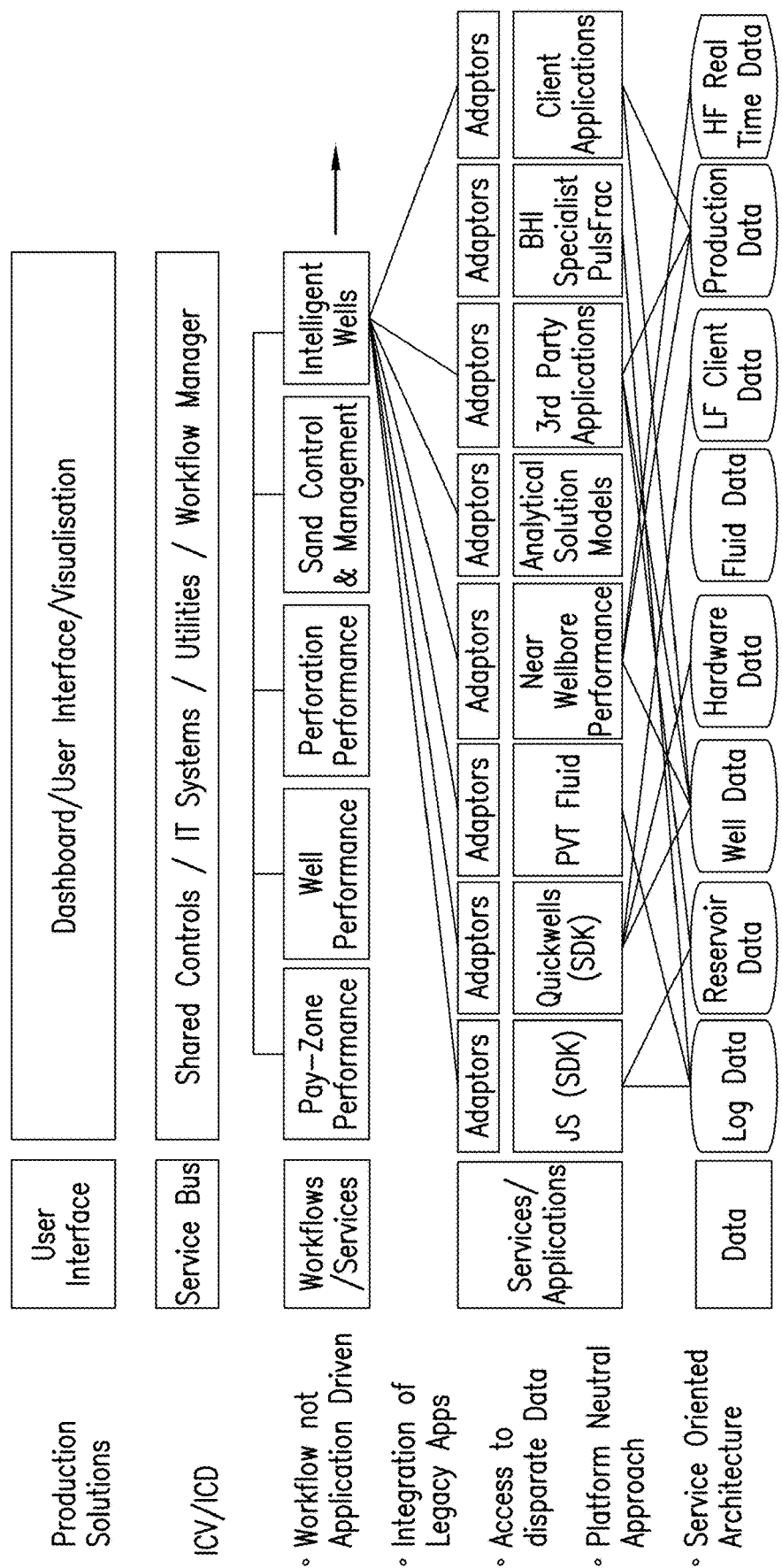
FIG. 3 depicts a processing system including processing modules, workflows and interfaces for performing functions including modeling, simulation and optimization of downhole components and environments.

FIG. 3 illustrates various aspects of an embodiment of the system, which provides a user interface that allows a user to visualize results, access and/or create workflows, execute models, simulations and predictions, and perform various processing and analysis methods. Many types of input data may be input to the system, which may be real time data acquired during an energy industry operation and/or stored data. The system includes a number of services/applications (discussed herein as processing modules) for executing models, simulations and analyses. In one embodiment, the system stores and/or provides tools for the creation of various workflows that can be created and/or accessed by a user to accomplish a variety of functions, such as evaluating well and pay-zone performance, sand control, performance of flow control devices or other components, using the processing modules.

Figure 4A:
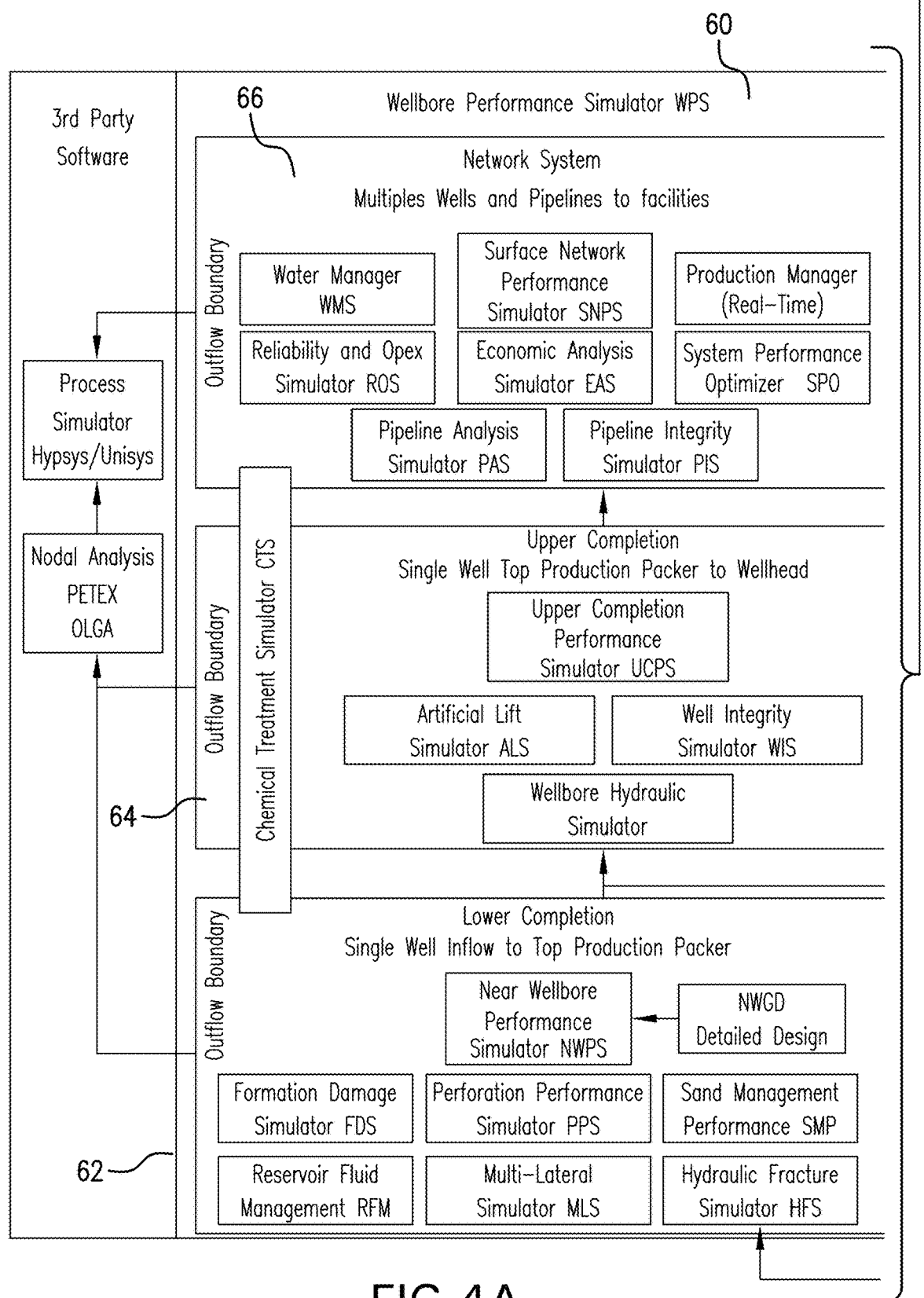
FIGS. 4A and 4B (collectively referred to as "FIG. 4") depict a processing environment that includes a wellbore performance simulation processing suite.
Figure 4B:
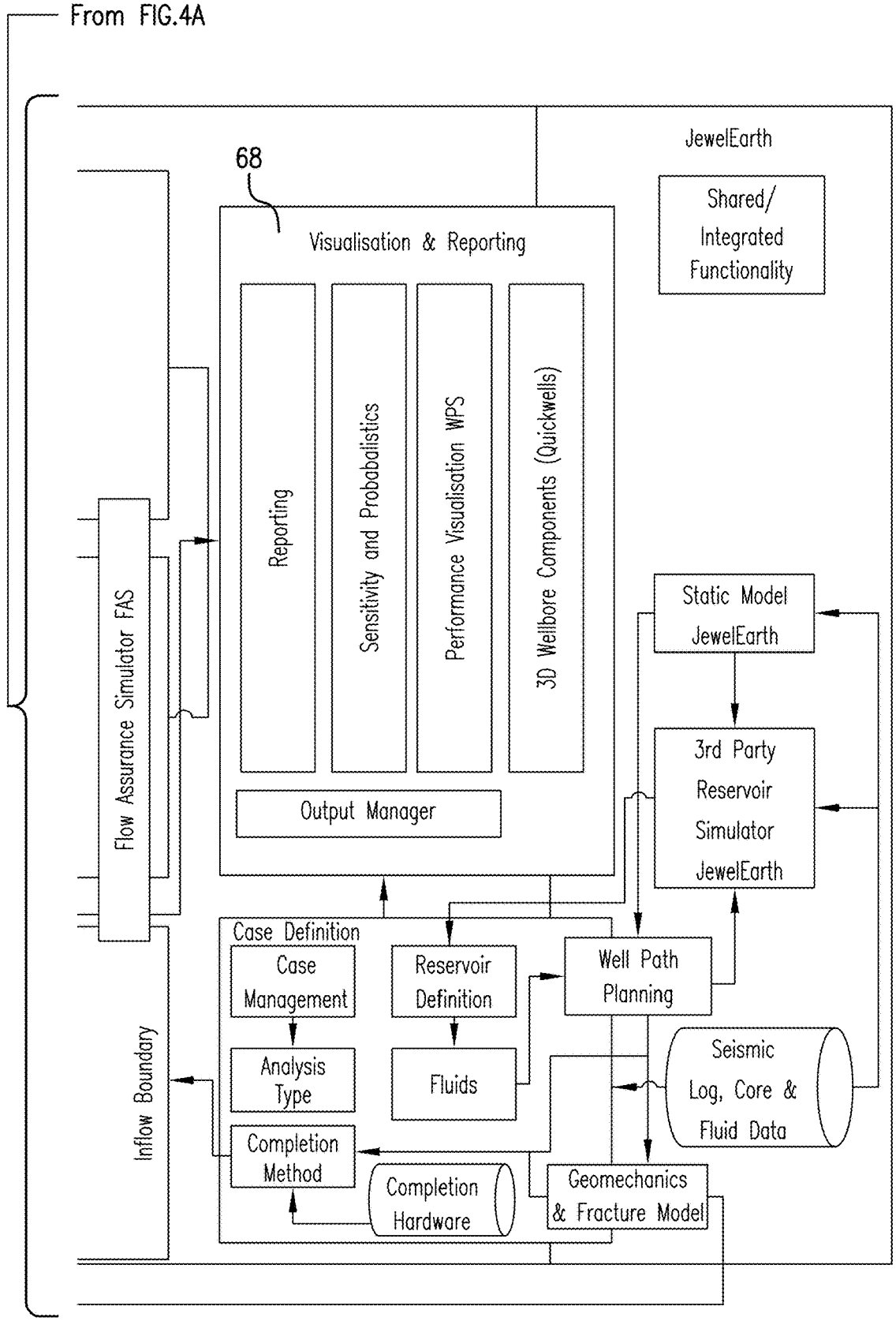

FIG. 4 illustrates aspects of an embodiment of the system, which includes multiple processing modules for simulating wellbore performance, and is denoted as a wellbore performance simulator (WPS) 60. The WPS 60 includes a "lower completion" module suite 62 that includes modules for defining well characteristics, operational characteristics and problems to be solved. The suite 62 provides performance analysis of production zones below a top production packer, and includes modules such as a near wellbore inflow (NWI) simulator, an input module (NWGD) for inputting design information and data (e.g., from a case definition module) into the NWI simulator, and various other simulation modules such as a fluid management module, formation damage simulator, hydraulic fracture simulator and others. An "upper completion" module suite 64 provides for simulation of production of fluids to the surface, and includes modules such as an upper completion performance simulator (UCPS), an artificial lift simulator and a well integrity simulator. A "surface performance" and/or optimization module suite 66 includes various modules for evaluating, performance, equipment integrity and system performance, and for evaluating economic returns. The WPS 60 also includes a visualization and reporting module 68. As shown in FIG. 4, the WPS 60 can connect or interface with various other processors and locations, such as third party software and an energy industry data storage, analysis and/or modeling software program. An example is JewelSuite™ analysis and modeling software by Baker Hughes Incorporated.

The various modules provide multi-dimensional simulations that provide a state-of-the-art capability not currently available to the practicing engineer, and provide a rigorous platform to simulate well performance down to the perforation scale increasing confidence in performance predictions in order to, e.g., evaluate and optimize completion designs and equipment selection, maximize performance within the multiple constraints of flow, stress and sand filtration, and optimize remedial activities and production operation decisions.

An embodiment of the system is a workflow based, integrated system having a plurality of modules for performing analyses such as a life of well analysis. The system provides a hierarchical methodology whereby semi-analytical engineering models may be applied for quick assessments or provide the ability to perform multi-dimensional simulations, capturing the nonlinear dynamics of the flow field, sand production, transport, filtration, and reservoir failure effects. The multi-dimensional simulations will provide a state-of-the-art capability not currently available to the practicing engineer.

The system may also incorporate methods to examine the sensitivity of results to selected model inputs as well as the ability to perform full probabilistic analyses providing probability distributions for designated inputs, allowing for assessment of uncertainties and suggesting optimal set points for design and operation.

The system may also include an interface to external data sources (measured or simulated) as inputs and boundary conditions, and in so doing, the proposed near wellbore methodology will have the ability to unobtrusively fit into a completion/production engineer's overall workflow, and therefore, provide an enhanced integrated functionality unique to the application. For example, the interface can provide access to other sources, systems and programs, such as: links to Completion ArchiTEX™ for well status information, PVT software systems for reservoir fluid characterization, technical perforation gun specifications, a ICD technical specifications catalogue, and a ESP technical specifications catalogue.

The system may employ a number of types of models for simulating or modeling the downhole environment. For example, a Regional Influx Model provides a simplified model of fluid flux from the reservoir to a simplified wellbore, and may be used in conjunction with interface routines that provide handshaking functionality between the near wellbore model and the global reservoir model. A micro-scale model provides a representation of a single perforation tunnel geometry and its associated local environment. The micro-scale model describes fracture or perforation tunnels and the physics of fluid flow through the tunnels.

This model may be a three-dimensional model solving the governing equations for liquid fluid flow, heat transport, sand transport/filtration, and modification of the porous media due to local damage, stress failure, and sand filtration.

A macro-scale model simulating an entire wellbore or production zone may incorporate the micro-scale model as a component. The macro-scale model may incorporate multiple perforation or production zones or regions. The macro-scale model simulates liquid-phase fluid flow, which may be a multiphase flow model accounting for a plurality of phases, such as one or more liquid phases (e.g., oil and/or water) and a gas phase.

Additional models and methods may be incorporated. For example, probabilistic methods may be implemented to provide for assessment of hardware reliability, input sensitivity factors, and uncertainties in input data. Examples of additional models include a sand transport model that simulates multiphase transport, and a sand erosion model to simulate the interaction between mobile sand and hardware components such as sand screens. Other models include descriptive models characterizing wellbore string hardware components.

Completion operations and production operations models may be used for assessment of well performance as part of the completions phase or the production phase. These models may address a wide spectrum of processes such as the modeling of fracturing treatments, gun system implementations and effectiveness, sensor deployments and prediction of measured data, inflow control device performance, water shutoff treatment techniques (mechanical and chemical), and other evolving technologies.

FIGS. 5-8 illustrate aspects of an embodiment of the system configured as an integrated life of well modeling and simulation environment that provides for increasing complexity and integration. The environment supports the creation of customizable workflows that can be executed by a processing device and/or used by a user to guide decision-making. For example, a user may follow aspects of workflows to direct execution of various modeling and/or analysis modules of different complexities.

The system may include various modules configured to perform aspects of the methods described herein. For example, a screening economics module can be configured to analyze various economic parameters to facilitate simulating and/or designing downhole components (e.g., completions). Economic parameters include, e.g., production volumes, commodity prices, capital costs, reliability, operating costs, schedules, discount rates, economic metrics, operational and component parameter ranges, and reporting costs. An uncertainty analysis module may be configured to estimate sensitivities and probabilities in simulations and models, and/or estimate parameters for optimization. A production performance optimization module can perform, e.g., model calibrations, inflow and outflow performance diagnostics, well integrity management, generation of remedial wellbore solutions and recompletion solutions, and well management. A completion design optimization module performs functions such as well and completion architecture optimization, formation damage assessment, perforation design optimization, sand control selection and optimization, stimulation benefits evaluation, well integrity risk assessment and estimation of optimized design performance. A model base build module may be provided for building various models used to estimate, e.g., formation or reservoir properties, reservoir management functional specifications, and well completion and architecture.

Another processing module may provide a user interface that displays information and assessment options and provides input facilities. The user interface may display various workflows and provide input features to allow a user to select from various options (type of model, level of complexity, etc.) and control aspects of simulation and analysis. The user interface can include features such as reporting, unit conversions, parameter default libraries, user guidelines, data management and connectivity.

Figure 5A:
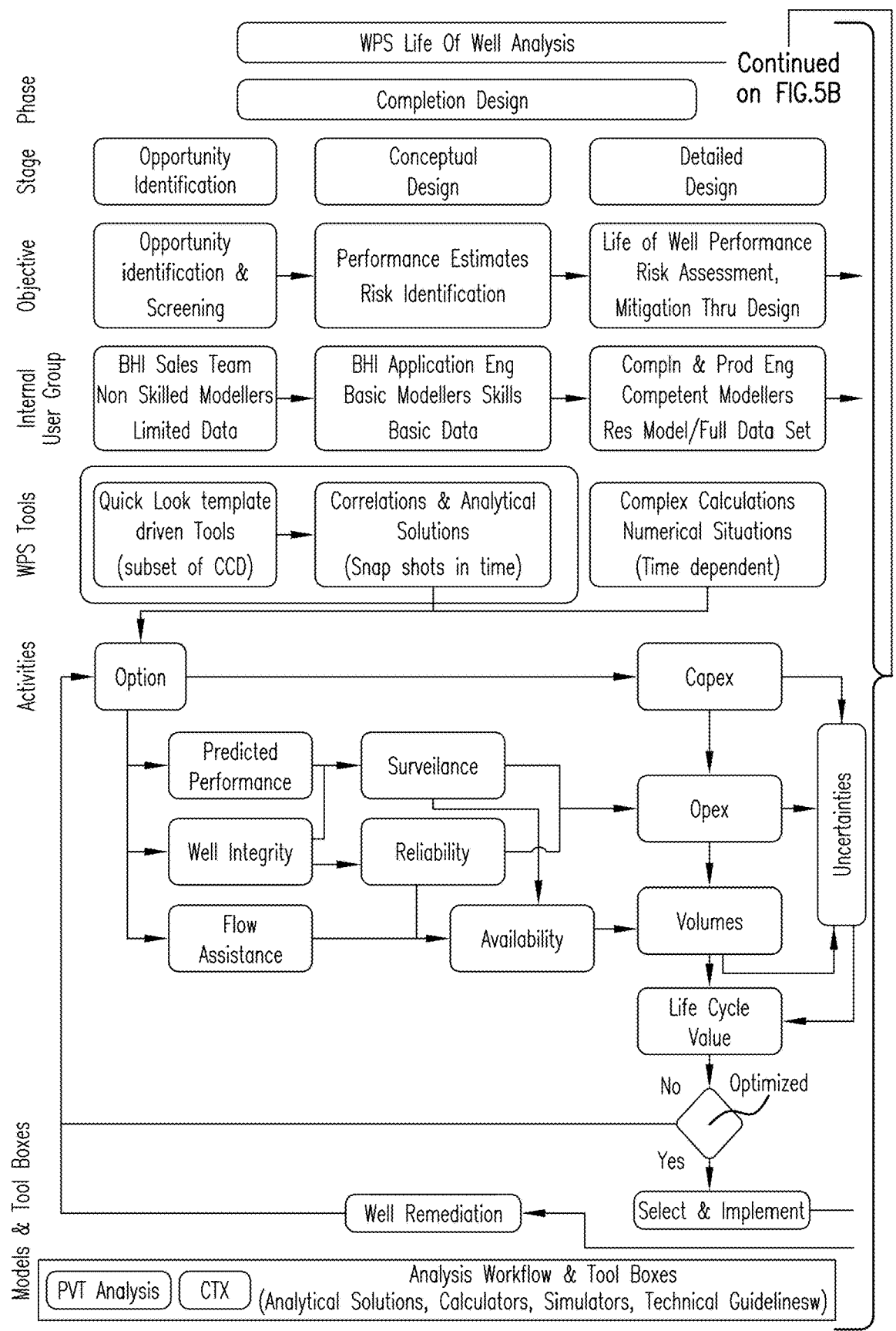
FIGS. 5A and 5B (collectively referred to as "FIG. 5") depict an example of workflows and processing modules or tools that may be generated or supplied to a user.
Figure 5B:
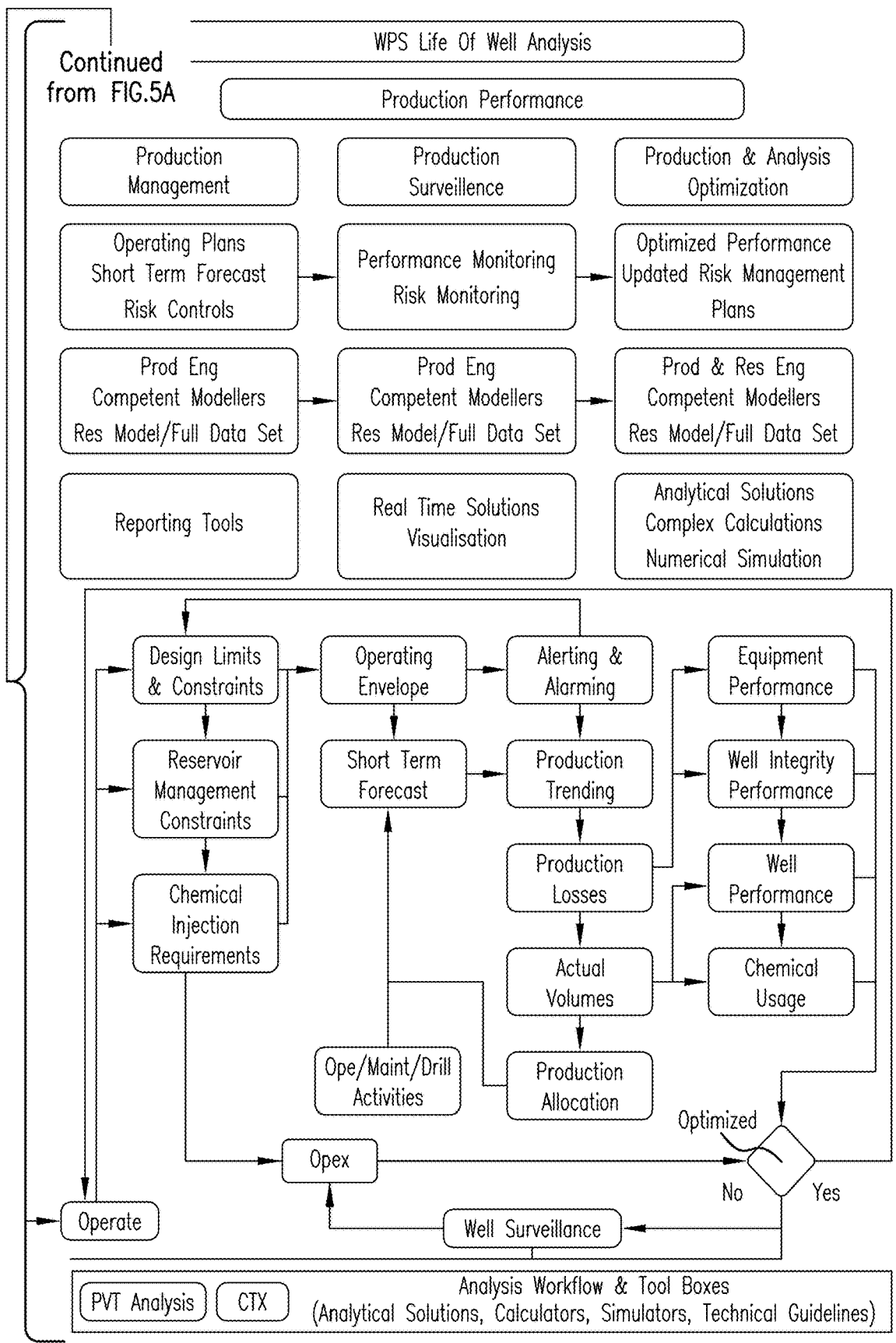

FIG. 5 illustrates an example of workflows and tool boxes that can be employed by the system. The workflows may be hierarchical and interactive to aid a user in making optimal design decisions and optimizing and/or improving well performance.

The workflows, in one embodiment, are generated based on the design goals of the operator or user, to direct operation of the system and/or guide the user through a particular design process, to ensure that the user is properly considering all the aspects of a particular process. The workflows may also act to prescribe how various modules are executed and interact with each other, and also how processing modules interact with the user interface.

Figure 6:
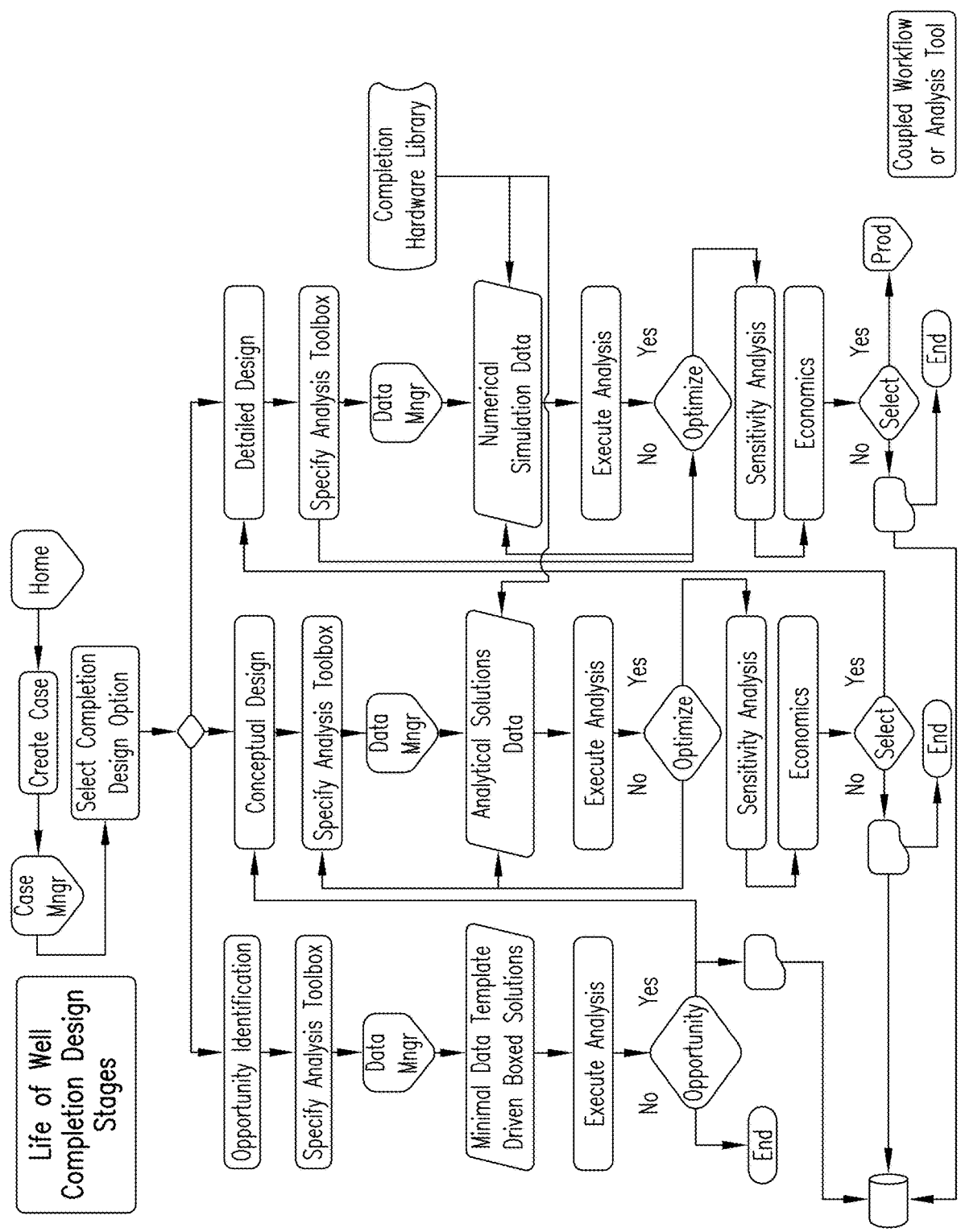
FIG. 6 depicts an example of a workflow that directs execution of various processes and/or guides a user in design of a wellbore completion system.

FIG. 6 shows an example of a workflow generated by the system that a user can employ to ensure that components such as completion components are properly designed. The workflow of FIG. 6 may be displayed or otherwise executed with the user interface to allow a user to determine or change design parameters and select analyses having different levels of complexity. For example, the workflow presents multiple completion design options, each having a different level of sensitivity or complexity. The workflow also includes one or more selectable elements (e.g., selection boxes such as a "Select Completion Design Option" block in the workflow of FIG. 6). For example, a user can select the "conceptual design" (CCD) option (e.g., by selecting the "Conceptual Design" box), which prompts the selection of an analysis toolbox including modules such as an analytical model, which is cruder than the relatively more precise (and involved in terms of computational and resource requirements) numerical modeling modules (e.g., a localized and/or extended formation simulator and wellbore model). The conceptual design option can thus provide a quicker output than the "detailed design" (DCD) option. It is noted that the user may select multiple options for execution (e.g., sequentially or in parallel).

Figure 7:
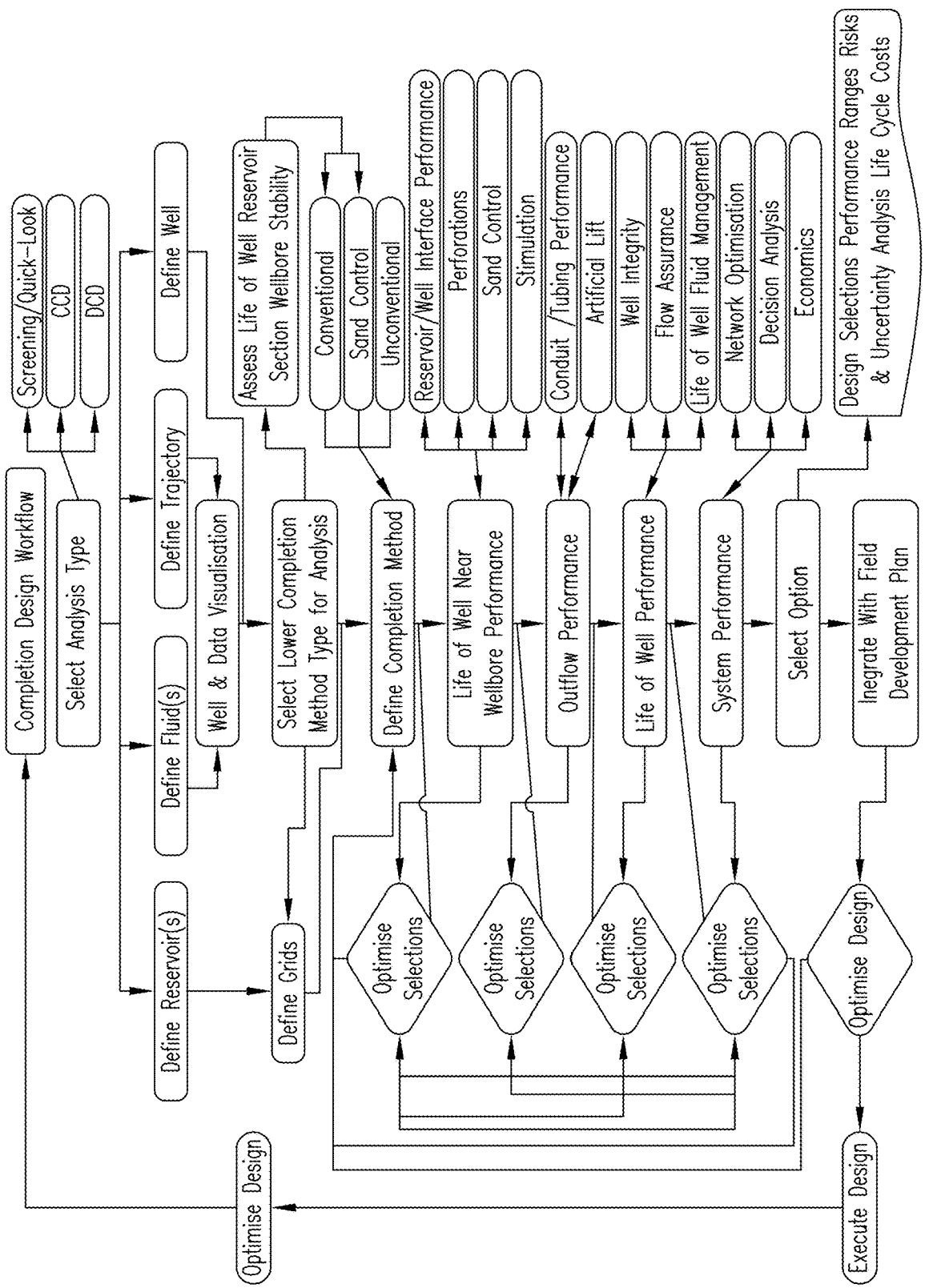
FIG. 7 depicts an example of a workflow that directs execution of various processes and/or guides a user in design of a wellbore completion system.
Figure 8A:
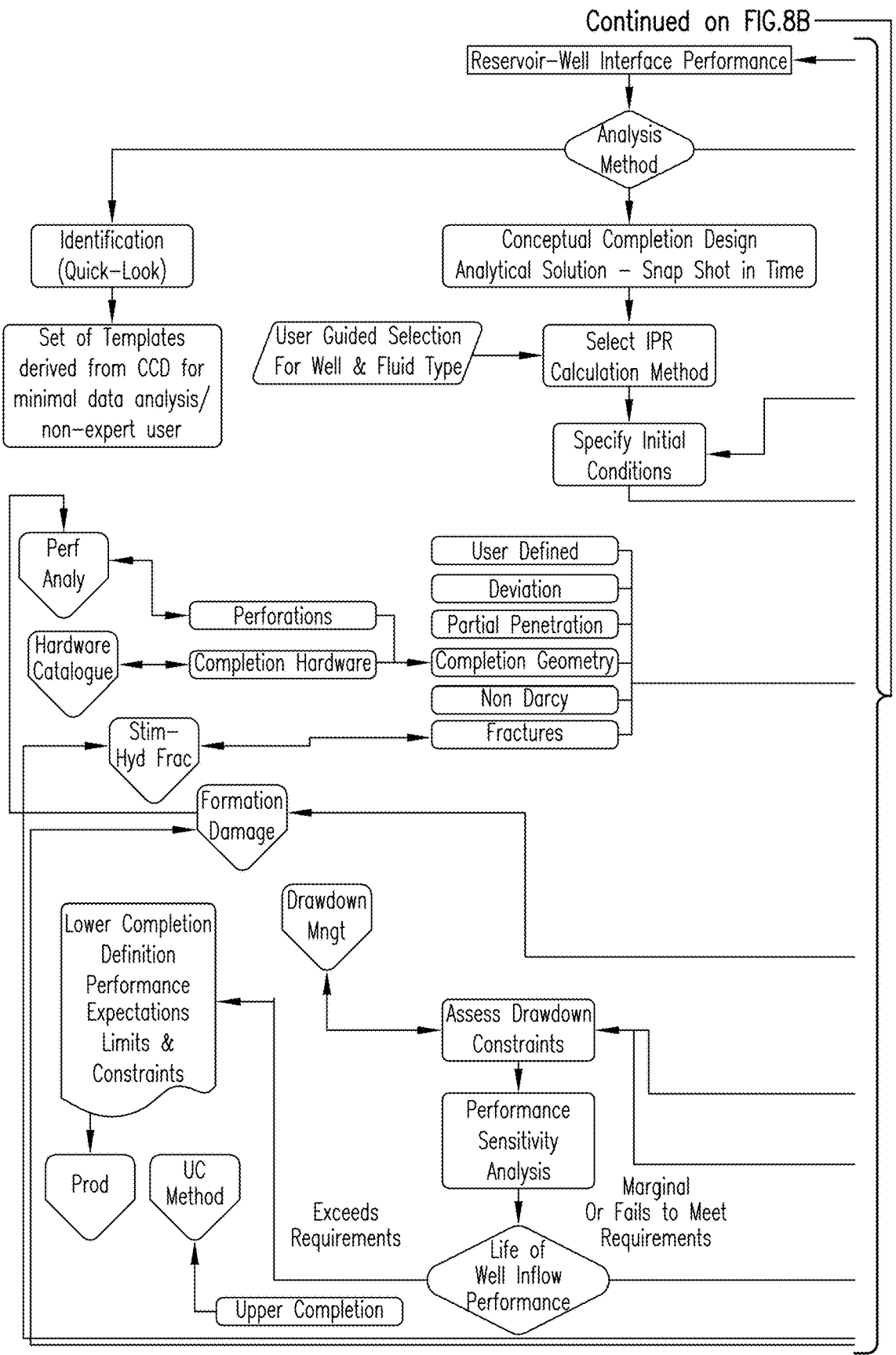
FIGS. 8A and 8B (collectively referred to as "FIG. 8") depict an example of a workflow for near wellbore performance analysis and risk assessment.
Figure 8B:
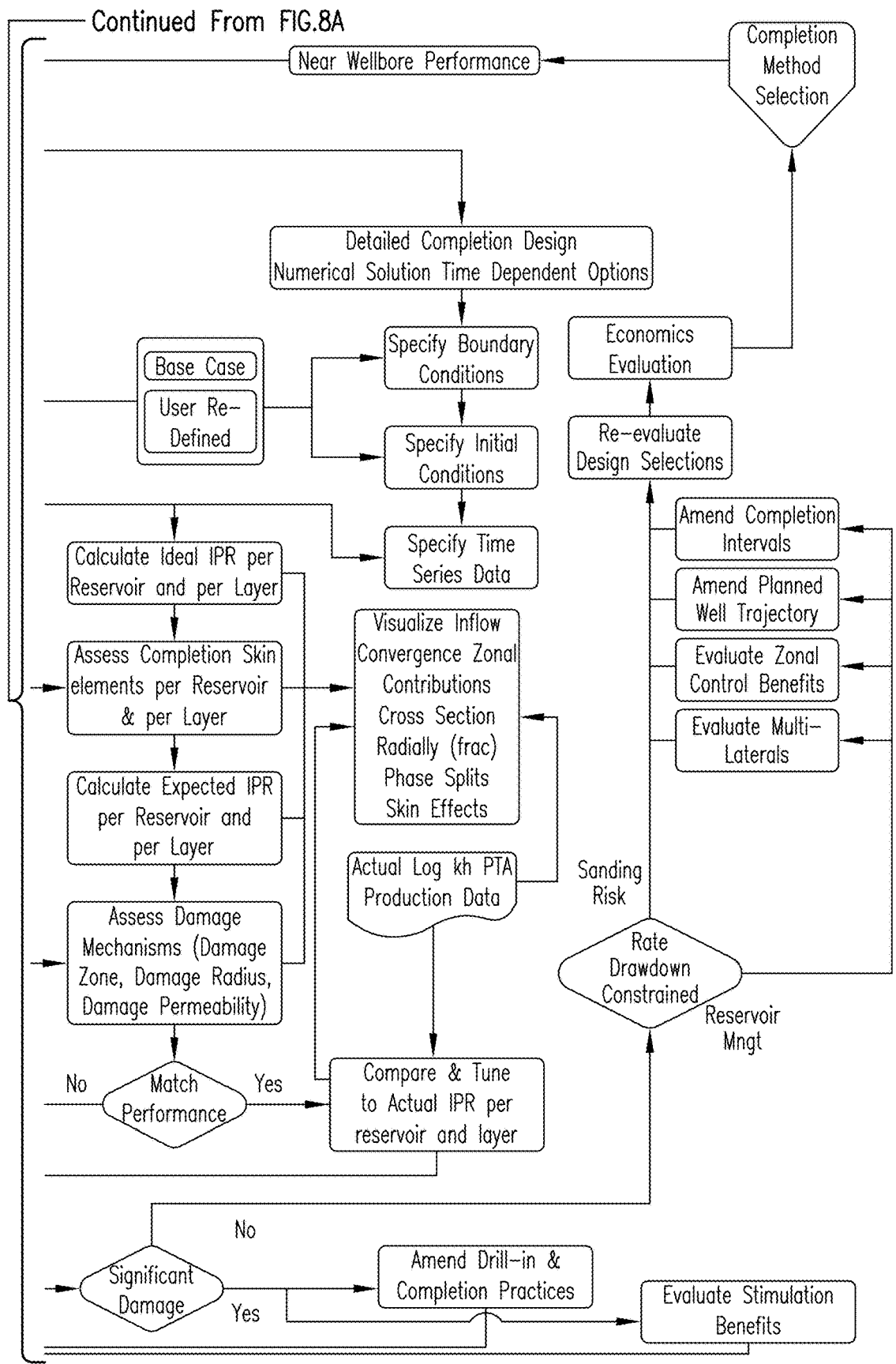

FIG. 7 shows another example of a completion design workflow that allows for selection of completion design options and also allows for selection of different inputs and analyses. For example, the completion design workflow include selectable elements (e.g., selection icons or boxes) such as the "Select Analysis Type" block and associated blocks that allow a user to select analyses such as a "screening/quick look" analysis, a CCD analysis and a DCD analysis. Alternatively, these elements may not be directly selectable but instead illustrate options that a user can select via other displays (such as the user interface of FIG. 9 discussed below). This workflow also prescribes methodology to optimize the design by employing selected processing modules. FIG. 8 shows a further example of a workflow for near wellbore performance analysis and risk assessment.

The workflows discussed herein are examples of workflows that can be created and are not intended to be limiting, as a user can select or design any workflow, including inputs and analyses, based on the specific goals of the user. The workflows, in one embodiment, are not pre-defined, so that a user has full flexibility to select objectives, program modules and results.

FIGS. 9-16 illustrate aspects of an embodiment of the system for performing near wellbore modeling and simulation to facilitate design of a completion and/or production system that includes fluid control devices. In this embodiment, components including flow control devices are designed, modeled or simulated and optimized based on user design inputs and input data from various sources.

The workflow and method may be executed using both analytical models and numerical simulators integrated into the processing system to enable users to design wells, such as horizontal wells requiring water influx management, to optimize reservoir recoveries.

Various processing modules are utilized to perform the modeling and simulation, such as an extended wellbore grid (XWB) solver, a near wellbore (NWB) solver, a completion modeler and a multiphase flow simulator (backbone). The completion modeling is performed by an integrated solver that incorporates these modules to adequately take into account the complex flow conduits encountered in ICD/ICV completions. The approach uses both the analytical and numerical simulators in conjunction with the optimizer to provide a differentiated model approach to the design and performance optimization of ICD and ICV completion equipment.

The workflows models and/or other processing components described herein may be used in a method of performing aspects of an energy industry operation, such as a drilling operation, a measurement operation, a stimulation operation (e.g., hydraulic fracturing) and/or a production operation. The method may include receiving input data including design parameters of a completion or other downhole component and available information regarding the formation (e.g., lithology, measured properties such as resistivity, etc.). A processor creates or selects a workflow based on the input data and present the workflow to a user. The user may select aspects of the analysis to be performed, such as the type of analysis (e.g., completion design and/or production analysis) and the level of complexity of the models and/or analysis used. The workflow may be customized based on the user selections and the processor performs the analysis. Analysis results may be used by the user and/or the processor to perform actions such as changing downhole component design and/or operational parameters (e.g., type of fluid, fluid pumping rate, etc.).

Figure 9:
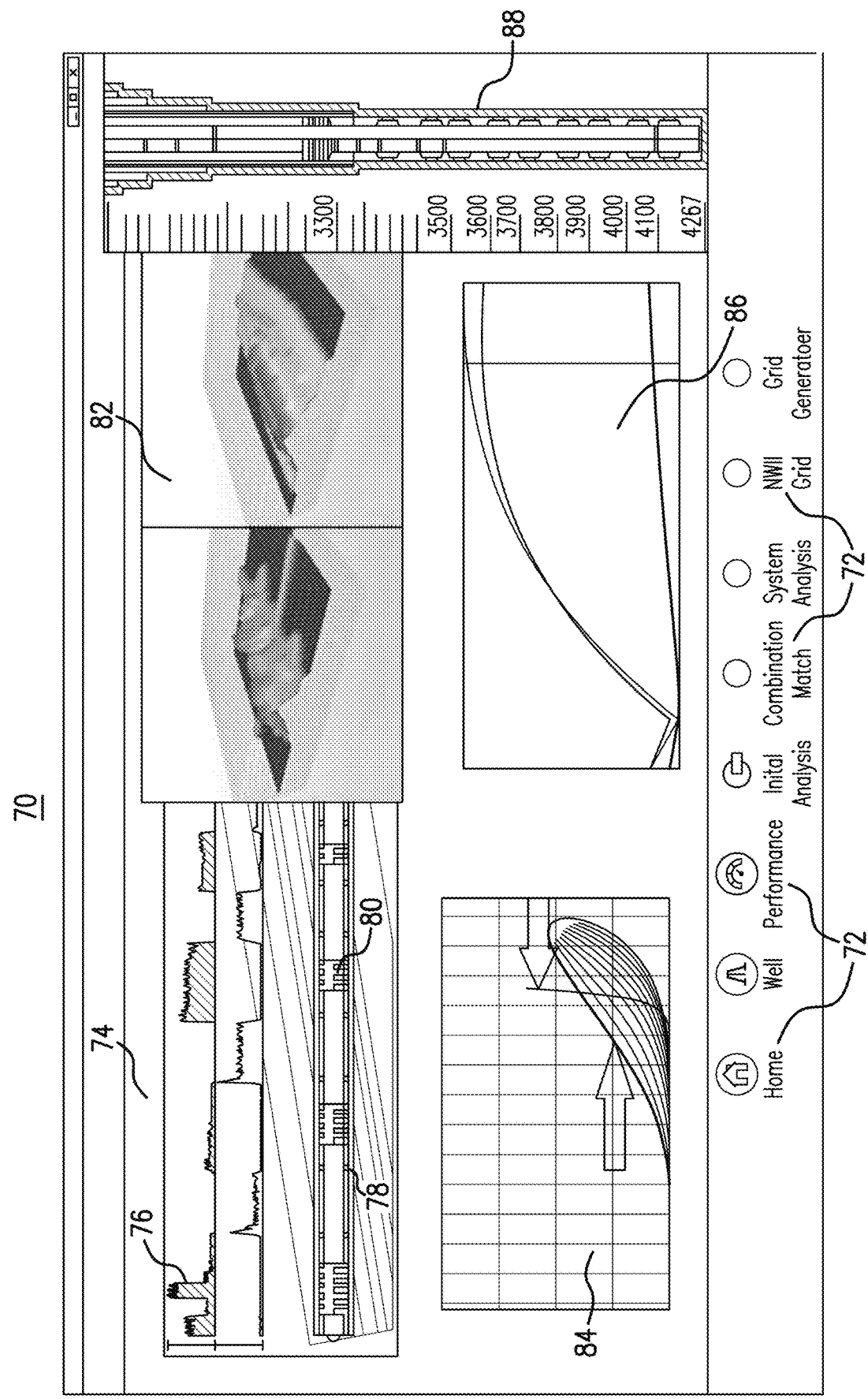
FIG. 9 depicts an example of a user interface.

FIG. 9 illustrates an example of a graphical user interface 70 that allows a user to interact with the system. The interface allows user to create a case for simulation and/or optimization, and specify or import data such as well trajectory data, PVT (pressure, volume, temperature) data, reservoir fluid characteristics and petrophysical data describing formation materials. The interface allows the user to enter data, visualize entered data and results, select and create workflows (including selection of processing modules), and modify designs. The interface includes selection icons or buttons 72 to allow the user to access parts of the system, including saving and accessing case files, and selecting and specifying well, formation, completion and fluid characteristics. The selection icons or buttons also allow the user to manage various simulations and analyses, including performance analysis, risk assessment, design optimization, and economic (cost/benefit) analysis. All aspects of modeling and simulation, including input data, workflows and results, can be visualized via the interface.

In the example of FIG. 9, the interface 70 includes a window or display configured as a completion view 74 that displays input information such as logging data 76 and design data showing simulated components selected by the user, such as ICDs 78 and packers 80. A grid view 82 displays results of a numerical extended grid simulation, and a display 84 shows fluid characteristic (PVT) data. A performance results display 86 provides the user with results such as cumulative production forecasts and economic forecasts (e.g., discounted cash flow). A design or component display window 88 may be included to visually specify the current design.

The integrated solver may include various processing modules, including a module that generates an analytical model (well performance model or WPM) and numerical models (well performance simulation or WPS). The integrated solver, in this embodiment, is the basic calculation engine in the ICD/ICV optimization workflow.

The WPM module is configured to solve steady state analytical models and also may include risk assessment and optimization tools. For example, the WPM module can use reservoir inflow performance (IPR) models for deviated and horizontal wells, and multi-phase flow modeling in wellbores and completions. WPS modules may include hierarchical flow solvers for different regions in and around a borehole. WPS flow solvers may include an extended grid solver configured as a transient numerical simulator for modeling flow in and around a well drainage volume, and a near wellbore solver configured as a transient numerical simulator for modeling flow in the immediate vicinity of a wellbore to better understand the fast transient and turbulence effects (and can be used for, e.g., well planning, completion equipment selection and production operations). WPS flow solvers may also include a backbone solver configured as a transient numerical simulator for modeling multi-phase flow inside of a wellbore and surface flow lines.

Figure 10A:
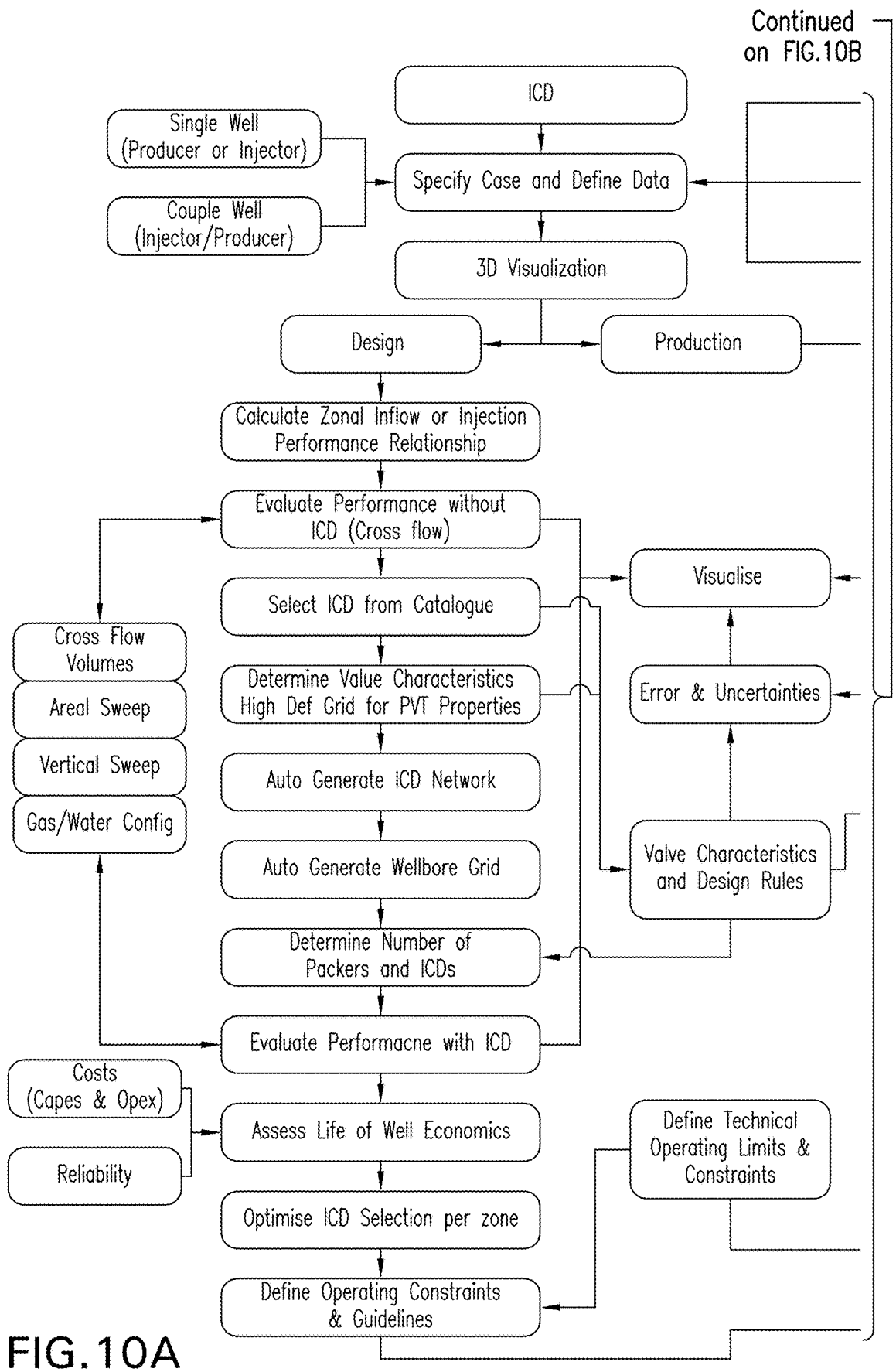
FIGS. 10A and 10B (collectively referred to as "FIG. 10") depict an embodiment of a design and optimization workflow.
Figure 10B:
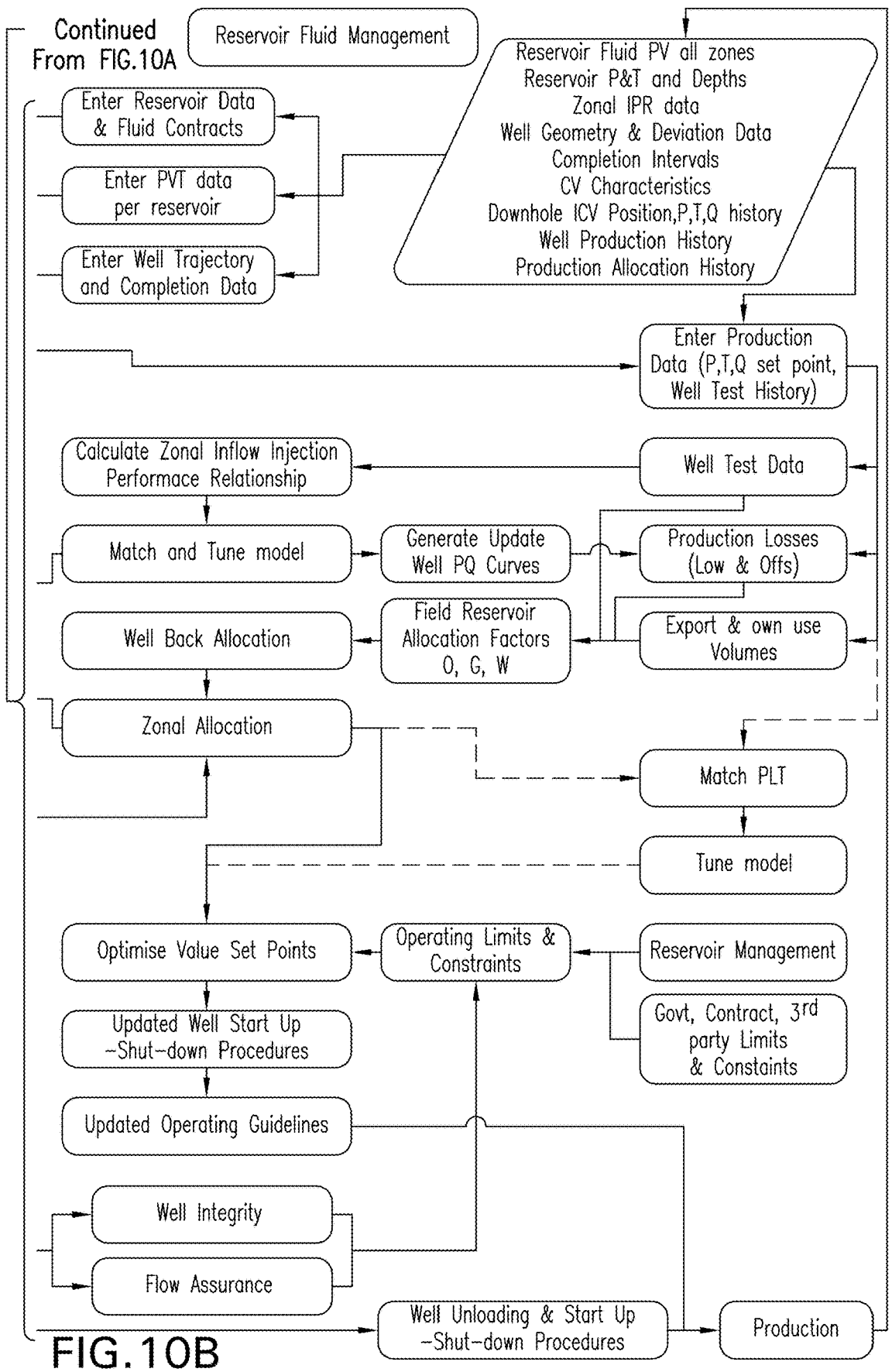

FIG. 10 shows a design and optimization workflow that is used by the system to interact with a user, e.g., by receiving input data from a user such as design data, measurement data and other pertinent information. The system may also interact with a user by receiving selections from the user to customize the workflow or build the workflow based on user objectives.

Figure 11:
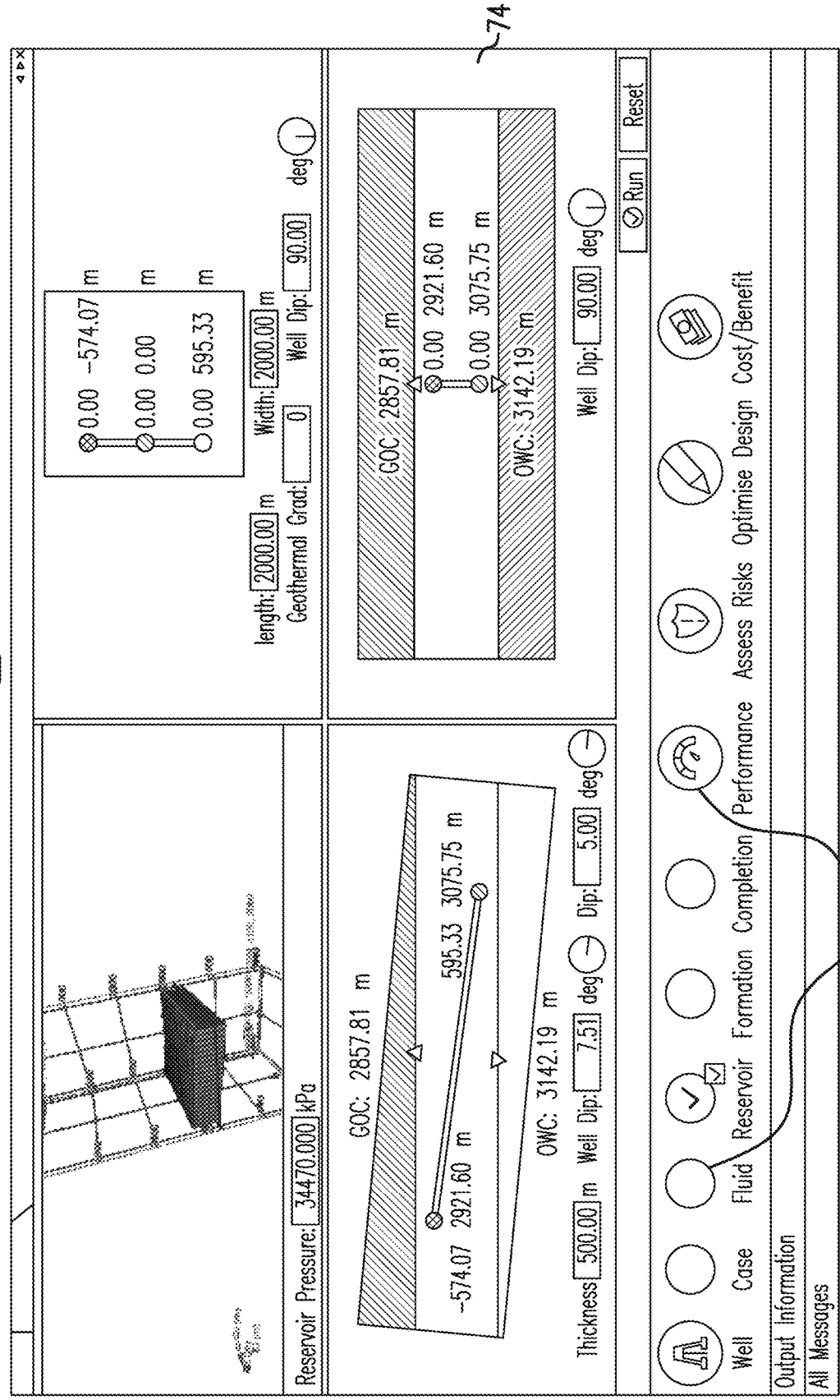
FIG. 11 depicts an example of a user interface configured to allow a user to interact with the workflow of FIG. 10.
Figure 12:
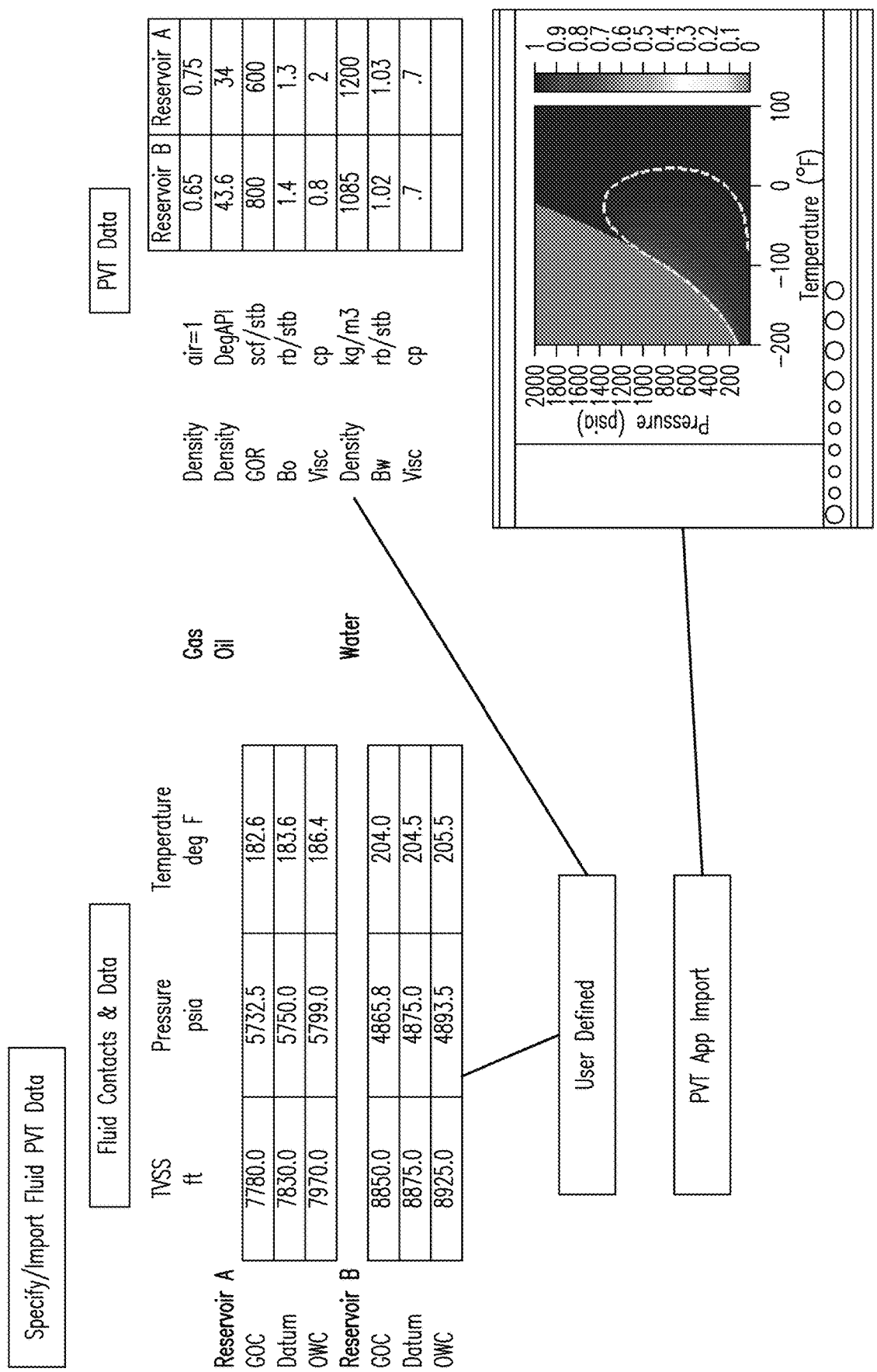
FIG. 12 depicts examples of input data used to perform processes prescribed by the workflow of FIG. 10.

The user interacts with the system via the graphical user interface 70. For example, as shown in FIG. 11, a user inputs various information that can be displayed and allows for the user to set and/or adjust input data such as formation and reservoir characteristics data. Data can be input directly to the graphical user interface or imported (e.g., via import files). Examples of data and information that can be specified and/or imported include well trajectory and nominal borehole diameter. FIG. 12 shows examples of PVT (pressure-volume-temperature) data that can be inputted and/or imported. Other inputs may include imported reservoir models (e.g., including reservoir grids and/or near wellbore grids) and user defined grids or grid features. Petrophysical data may be imported and/or specified, such as caliper log data, formation layers, rock types, net/gross production data, permeability, porosity, and rock strength. The petrophysical data may be input directly by a user or provided via imported data, such as imported well logs.

Figure 13:
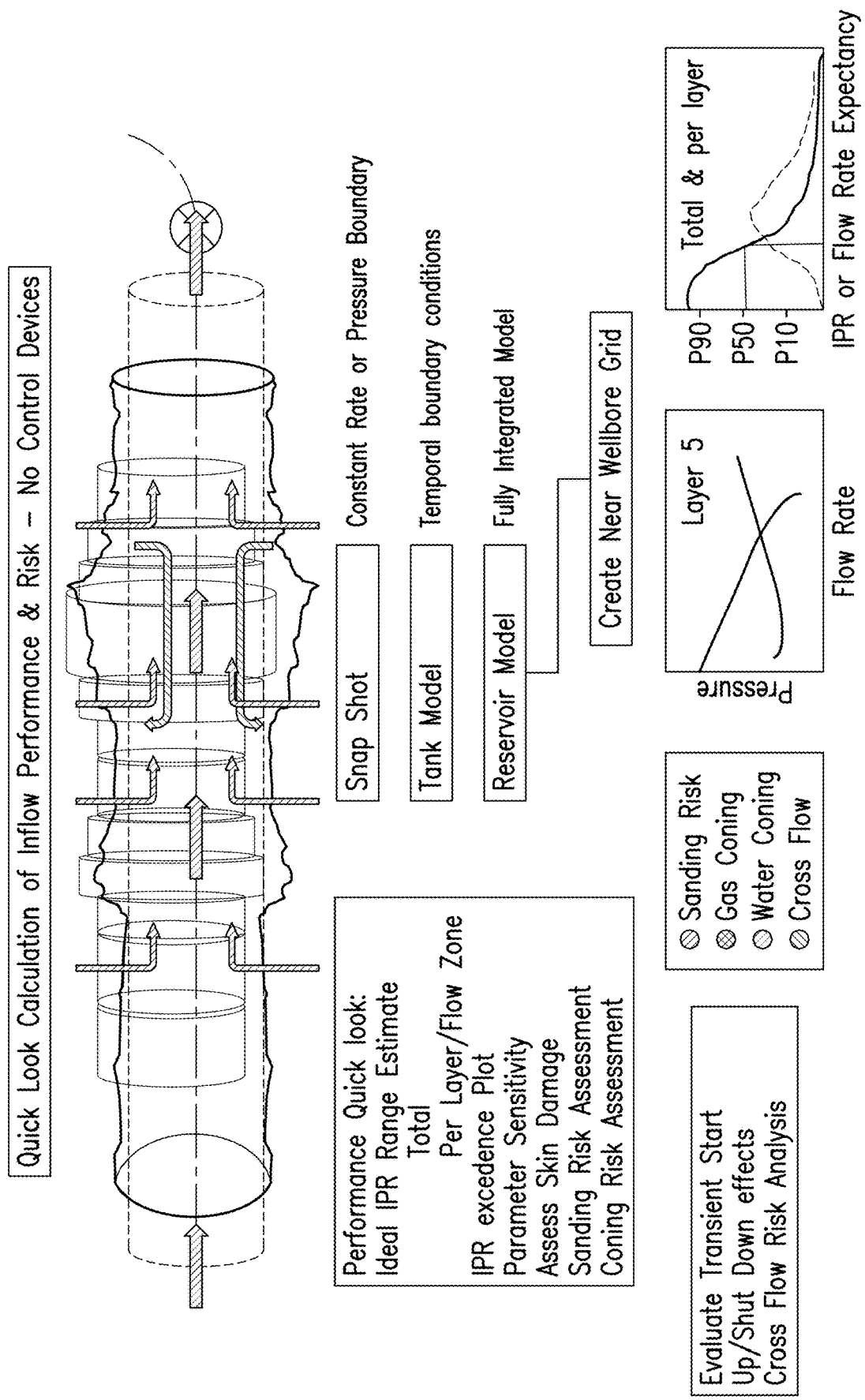
FIG. 13 depicts aspects of an example of a quick look calculation of inflow performance.

FIG. 13 illustrates a quick look calculation that may be performed by the system. This calculation is performed in the absence of fluid control devices.

The system, in this embodiment, generates a near wellbore grid of a formation volume and populates the grid with petrophysical data. Completion data is imported or specified, such as ICD type (e.g., selected using PVT data), and selection of specific ICDs (e.g., from a catalogue based on considerations such as design rules, number of ICDs needed, strength, pressure drop characteristics, and other constraints and limits). A generic sub or component assembly can be imported.

Figure 14:
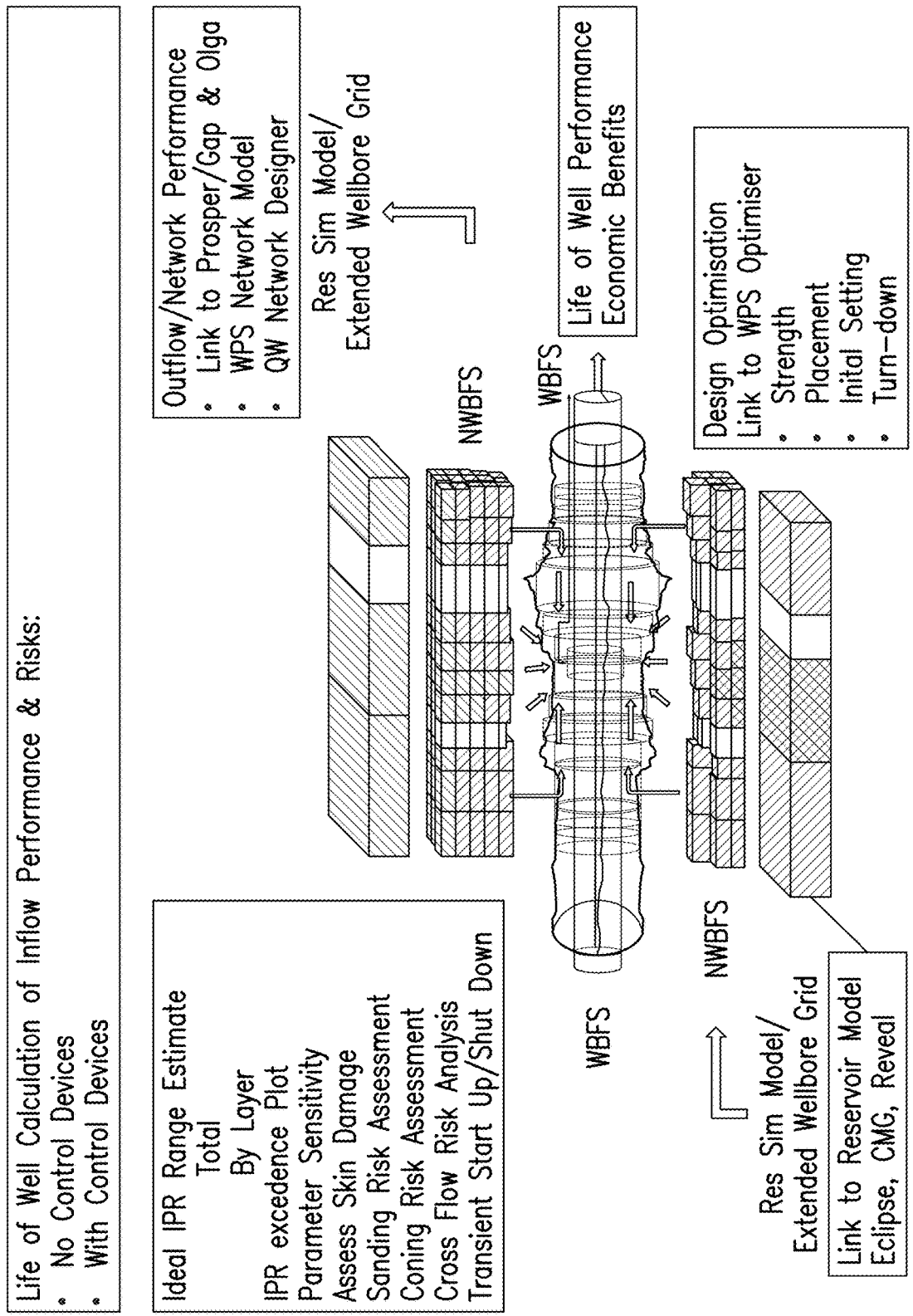
FIG. 14 depicts aspects of an example of a life of well calculation of inflow performance and risks.
Figure 15:
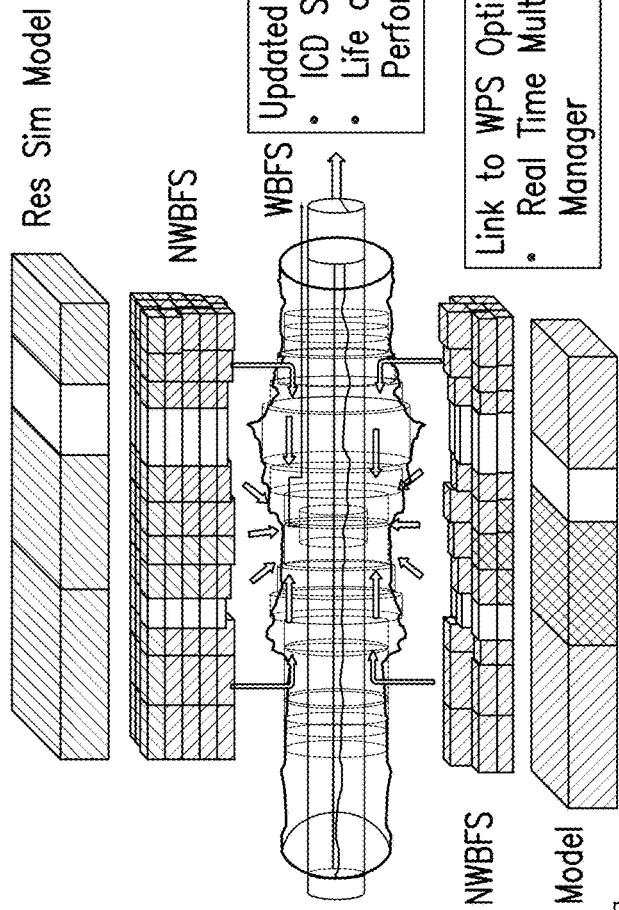
FIG. 15 depicts aspects of an example of a calculation of production performance.

The integrated solver can perform life of well calculations that include generating flow models and outputting performance results and optimization results via, e.g., the interface. FIGS. 14 and 15 illustrate examples of such calculations.

The extended wellbore grid (XWB) solver utilizes boundary conditions such as no-flow boundaries for all external bounds. In one example, each boundary edge's (e.g., 6 faces) boundary conditions can be set independently. Boundary conditions may include no-flow, constant pressure with varying fluxes of each phases, i.e. a user can define flux of each phase independently. The boundary conditions may be set cell-by-cell.

In one example, the input to the integrated simulator is through a single keyword file. The keyword file for XWB is closest to the anticipated modifications. The integrated solver accepts well trajectory data as an array of TVD (true vertical depth), MD (measured depth), INCLINATION and AZIMUTH. The integrated solver internally calculates a grid for the backbone solver and utilizes it to calculate well way points for XWB as well. By default, grid generation is transparent to the user. The integrated solver keyword file includes completion configuration that provides the start MD of the completion, length of completion, type of completion and attributes of completion of its type (perforation length etc.)

XWB grid generation is an integrated module and can be controlled by the user. The grid generation may be handled internally in XWB for dipped formation layers by adjusting the gravity vector appropriately or by rotating the grid accordingly.

The integrated solver and the optimization modules can be used to maximize the cumulative oil production throughout the life of well. For example, the optimizer provides recommendations such as the location and number of packers (with or without some "locked" packers), the number of ICDs or ICVs in each partition or production zone, and ICD or ICV sizes (strength) in each partition. In addition to ICD optimization the ICV/MultiNode system operation optimization may recommend choke settings as function of time. It is noted that the outputs and recommendations may be calculated in real time, e.g., during production.

Figure 16:
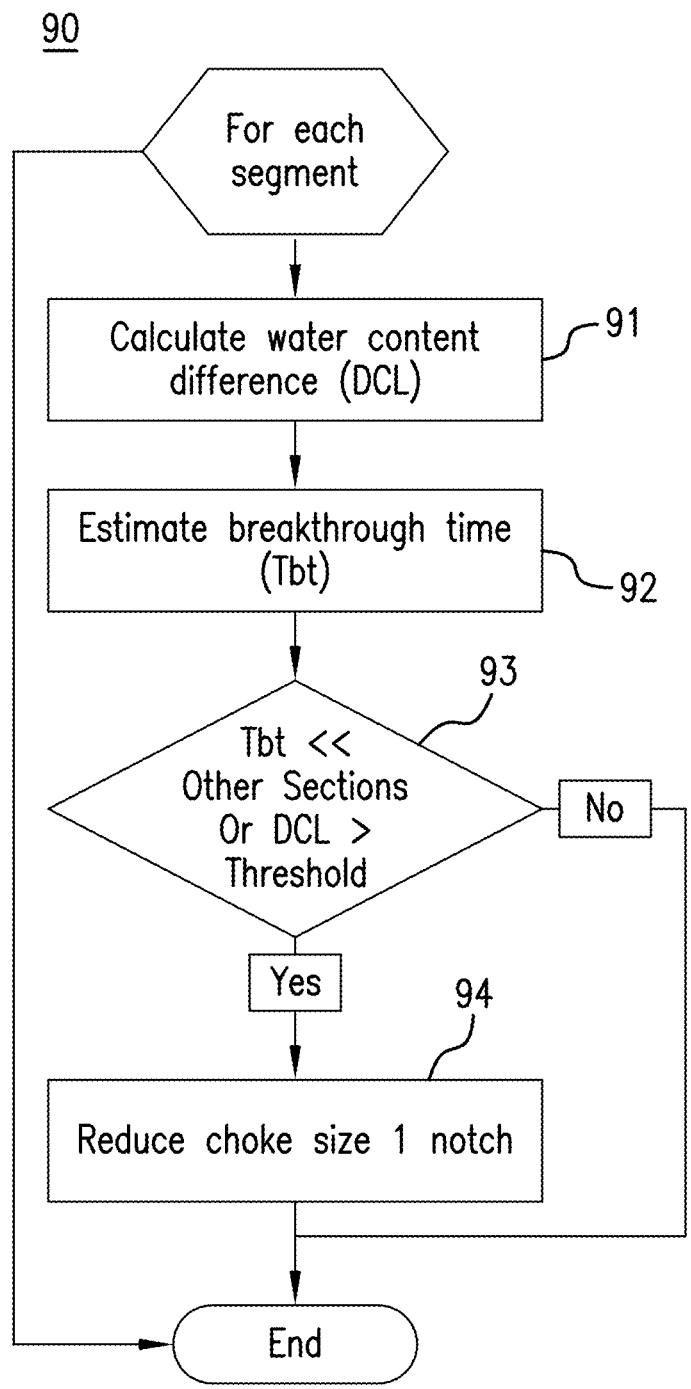
FIG. 16 depicts an algorithm for generating a time schedule for control of fluid control device settings.

Choke settings may be provided according to a time schedule based on rules and user defined control parameters. An example of a control algorithm 90 that may be executed to generate a time schedule based on user defined time intervals is shown in FIG. 16. For each segment of a borehole string or completion including a choke, the water contact difference (DCL) is calculated (block 91) and breakthrough time (Tbt) is estimated (block 92). The Tbt at the current segment is compared to the Tbt calculated for other segments or the DCL is compared to a threshold (block 93). If the Tbt is less than other segments by at least a selected amount or the DCL is greater than the threshold, the choke size is reduced, e.g., by one notch (block 94).

The workflow can be extended to enable production diagnostics and production optimization of set points for surface controlled ICV in horizontal or conventional multi-zones reservoirs or stacked reservoirs. In addition, the optimizer may be utilized in solving additional workflow incorporating artificial lift, surface networks, flow assurance, well integrity design and operating as part of the multi-year development program in line with the original concept.

One of the innovations in implementation of optimization of ICD/ICV design optimization workflows includes the replacement of various tedious manual steps in current practice with automated algorithms. These automated approaches improve the efficiency and accuracy of the analysis and design by reducing complexity and the time required to perform them. These process steps include:

1) Automated generation of a flow network to accurately model the flow from the formation to the production string through annulus and flow control devices; and 2) Interactive user interface coupled with dynamic visualization of analysis.

FIGS. 17-21 illustrate embodiments of an optimization method that may be performed via the system and one or more workflows.

Figure 17:
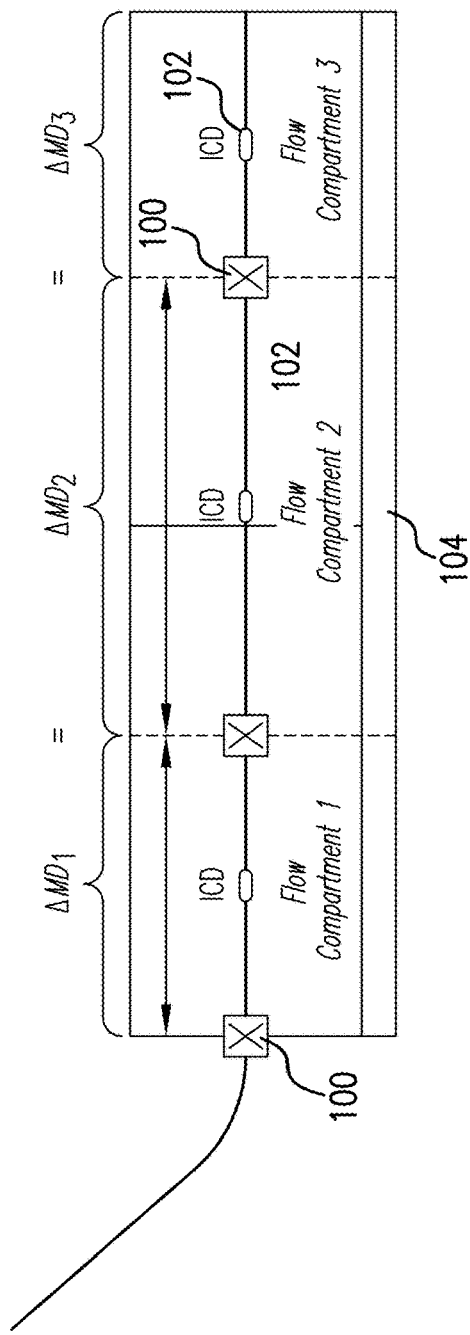
FIGS. 17 and 18 illustrate selected designs of fluid control devices and other components, as part of an optimization method.

Referring to FIG. 17, in this embodiment, a first workflow is used to model components such as a number of packers 100 and fluid control devices 102 (e.g., ICDs) in a completion string 104. This workflow uses the location of a predefined number of packers 100 as the design variables to optimize the system. The number of packers (N) remains constant during the optimization process, and there are (N−1) degrees of freedom. A single ICD 102 is placed centrally between each set of packers and between the last packer and the end of the last unit for a total of (N) ICDs. Each pair of packers 100 and an ICD 102 therebetween defines a flow compartment or a unit.

A three packer system for this workflow is pictorially represented in FIG. 17. In this example there are two natural, originally-in-place units (i.e., defined by the input deck). The optimization problem includes:

one statically placed packer at the head of the first unit;

two (i.e., N−1) packers are moved around within the system until an optimized system is achieved, which corresponds to two degrees of freedom: $\Delta M\ D_1$ and $\Delta M\ D_2$; and three ICDs are placed in the system, one centrally in each flow compartment created by the packers.

Another workflow is discussed with reference to FIG. 18. This workflow uses the number of equally spaced packers 100 as the design variable to optimize the system. There is one degree of freedom, the number (N) of equally spaced packers. A single ICD 102 is placed centrally between each set of packers and between the last packer and the end of the last unit for a total of (N) equally spaced ICDs.

Figure 18:
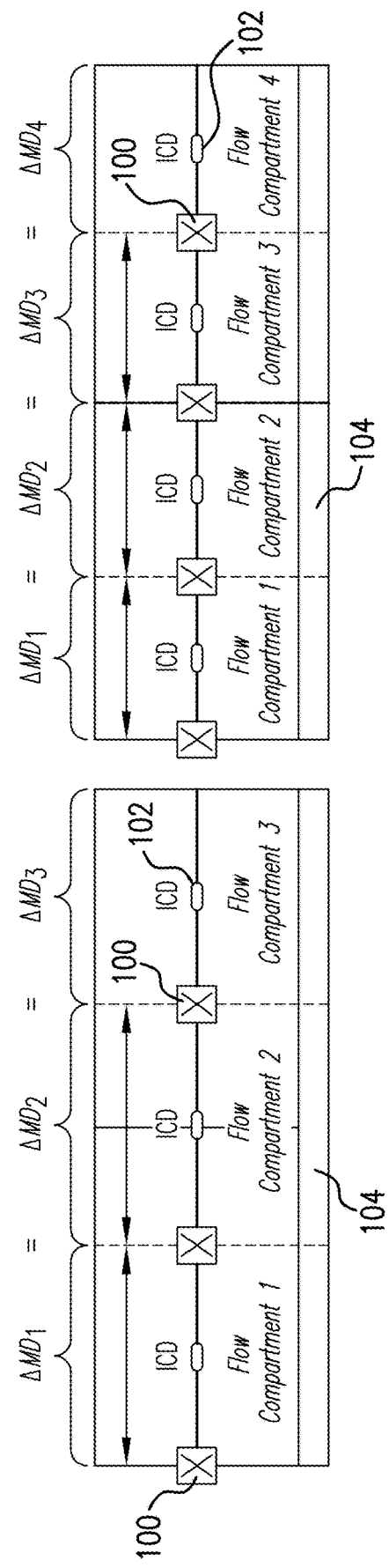

FIG. 18 represents examples of three and four packer systems for this workflow. In these examples there are two natural, originally-in-place units. The optimization problem includes:

one statically placed packer at the head of the first unit. If there is only one packer selected, then it is placed in this location and the ICD is centered between the beginning and end of all units; and remaining packers are equally spaced across the system.

Figure 19:
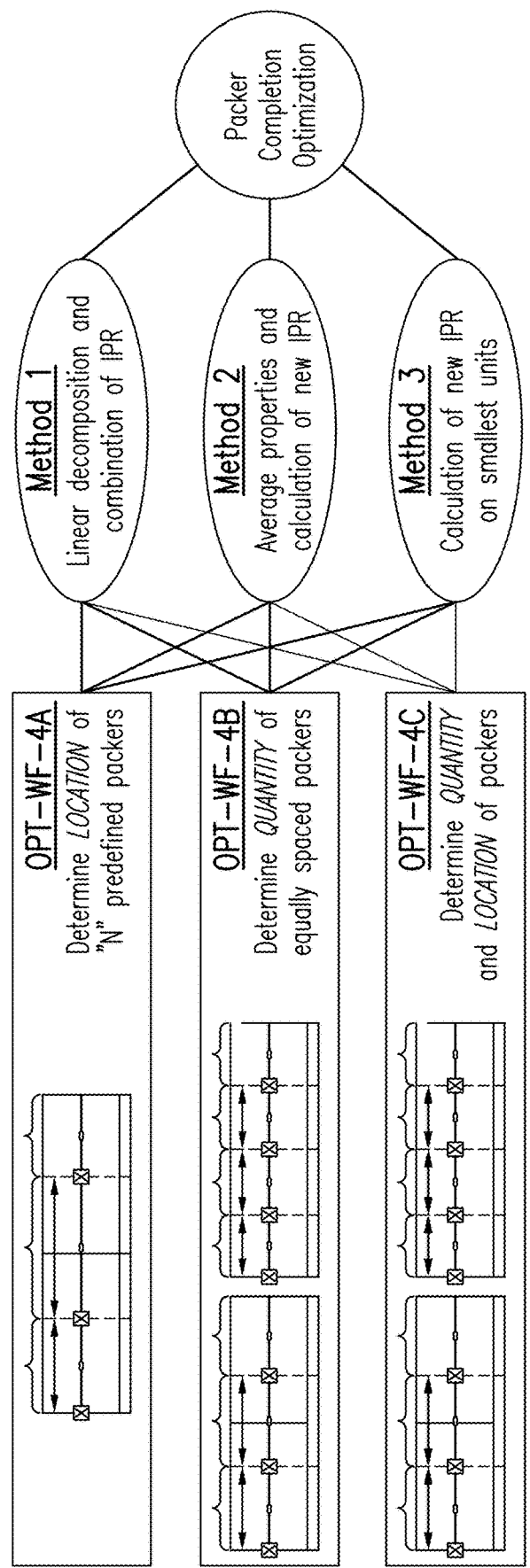
FIG. 19 illustrates methods that can be employed for optimization of component designs.

Various methods of optimization may be employed as shown in FIG. 19. The methods may be employed alone or in combination. The optimization methods allow for determining, e.g., an optimal number and/or location of packers and/or units. For example, optimization can be performed to determine a location of N pre-defined packers (OPT-WF-4A), a quantity of equally spaced packers (OPT-WF-4B), or both the quantity and location of packers (OPT-WF-4C). Each of these optimizations can be accomplished using one or more of three optimization methods (Method 1, 2 and 3) to evaluate inflow performance (IPR) and optimize based thereon.

In one embodiment, optimization is performed using one of a number of objective functions. A first objective function is designed to maximize total system flow rate and to control or delay breakthrough time (or limit flow rates) in individual units. The flow rate is maximized through the objective function of the optimization problem. The per unit breakthrough time or flow rate is limited by applying non-linear constraints to the system.

This objective function is one of the most general and practical and requires the least amount of information to use. It does not rely on prescribed target flow rate or breakthrough times, which may be difficult or require extra work to know a priori. It only requires an estimate of the limiting breakthrough time or flow rate, as opposed to trying to obtain an exact target. Non-linear constraint functionality to implement this objective function is explained as follows.

The constraint referred to herein as the "exact L1 penalty", which is for problems of the form:

$$\text{minimize}\left[f(x) + \sum_{j=1}^{n} c_j \max(g_j(x), 0)\right]$$

subject to variable bounds: $|l \le x \le u|$, where $f(x)$ is the main objective function, x is a set of design variables bounded by lower (l) and upper (u) bounds, $c_j$ are a set of n penalty parameters, and $g(x)$ is a constraint value function of the form $g_j(x) \le 0$ which only has an effect if the constraint is violated.

When constraints are violated, as per the equation above, a positive value is applied to the objective function to signal a value that cannot possibly be an optimally feasible solution.

The penalty parameter is of the form:

$$c_j = \lambda\left[1 + \frac{(B_m - B_{m,constraint})}{B_m, \text{constraint}}\right]$$

where $\lambda$ is a penalty factor and $B_m$ is the limited variable in the constraint function, per unit m, defined by $g(x) = R_m - R_{m,constraint} < 0$ This form serves two purposes: to give a normalized relative weighting to each of the constraints, and to provide a slope to the penalty parameter as the constrained value is further from the prescribed constraint condition. This provides a way to encourage convergence as "more" infeasible samples will have larger penalty values. This is opposed to applying a constant penalty which will cause too much time to be spent on a flat or nearly constant penalty surface.

The caveat of the "exact L1 penalty" method is that penalty parameter values must be appropriate for the modeled system. Smaller parameters can increase speed of optimization but can result in missing the global optimum. Larger penalty parameters can assure convergence but can bias away from feasible/infeasible result boundaries which can slow convergence. Values for $\lambda$ may be assigned by default within an optimization or modeling module based on observations of the optimization during implementation. A keyword may also be available for modification of $\lambda$ for expert users.

Figure 20:
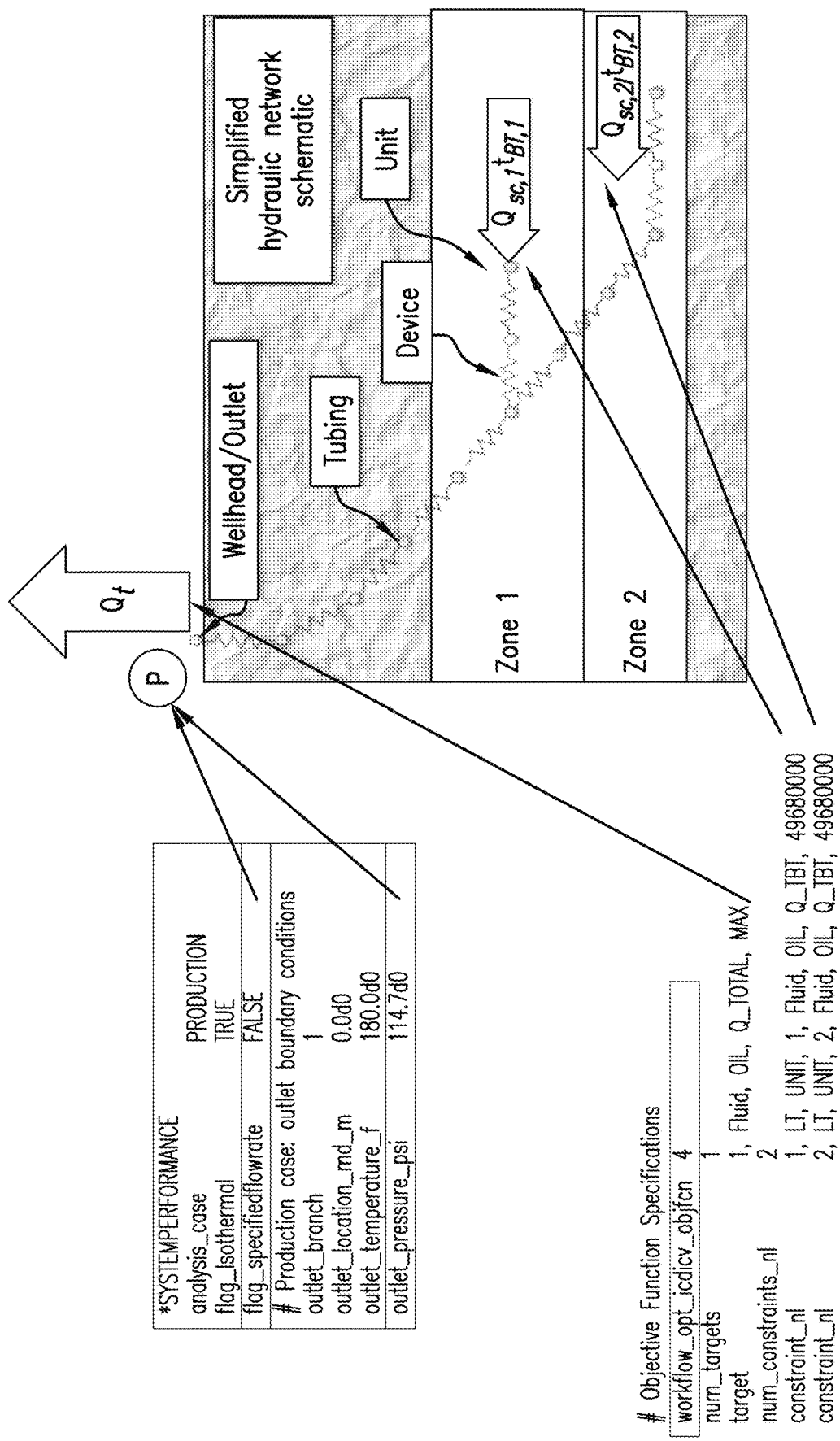
FIGS. 20 and 21 depict aspects of optimizing a downhole component design based on an objective function model.

The first objective function may be used in an optimization method for maximizing flow rate and controlling flow or breakthrough time, an example of which is shown in FIG. 20.

In this method, an objective function model is provided for maximizing the sum of the flow rate in each unit m ($Q_{sc}^m$) as shown as follows:

$$\Sigma_m(Q_{sc}^m)$$

This function is valid on a total system basis. It is noted that, in some cases, the integrated solver or processor may actually solve for the minimum of the reverse objective function ($\Sigma_m(-Q_{sc}^m)$). Flow rates are in units of $Sm^3/s$ (surface volumetric conditions).

The relationship between flow in different units may be represented by:

$$Q_{sc}^m = \frac{Q_{res(Rm^3/s)}^m}{B_{o,Pres}^m} = \frac{\overset{\circ}{m}{}^{\circ m}}{\rho_{Pres}^m B_{o,Pres}^m}$$

with the following constraints:

$$t_{BT}^m < t_{BT,target}^m \text{ or}$$

$$Q_{sc}^m < Q_{sc,target}^m,$$

where $Q_{res}^m$ is the reservoir flow rate, $B_{o,Pres}^m$ is a variable, $\rho_{Pres}^m$ is fluid density, $t_{BT}^m$ is the breakthrough time for a unit m, and $t_{BT,target}^m$ and $Q_{sc,target}^m$ are target values of breakthrough time and flow rate respectively.

Application requirements for a fully constrained system include the following. Boundary conditions are valid for systems with prescribed tubing well head pressure as boundary condition specification. Inputs include specification of the unit breakthrough time (or flow rate) constraints. FIG. 20 illustrates aspects of the optimization method inputting boundary specifications P, such as whether a specific flow rate is flagged, outlet location, outlet temperature and outlet pressure. Objective function specifications are also input, such as an objective function $Q_t$, the number and types of target values, and constraints $Q_{sc}$, $t_{BT}$ for each formation zone (Zone 1 and Zone 2).

Figure 21:
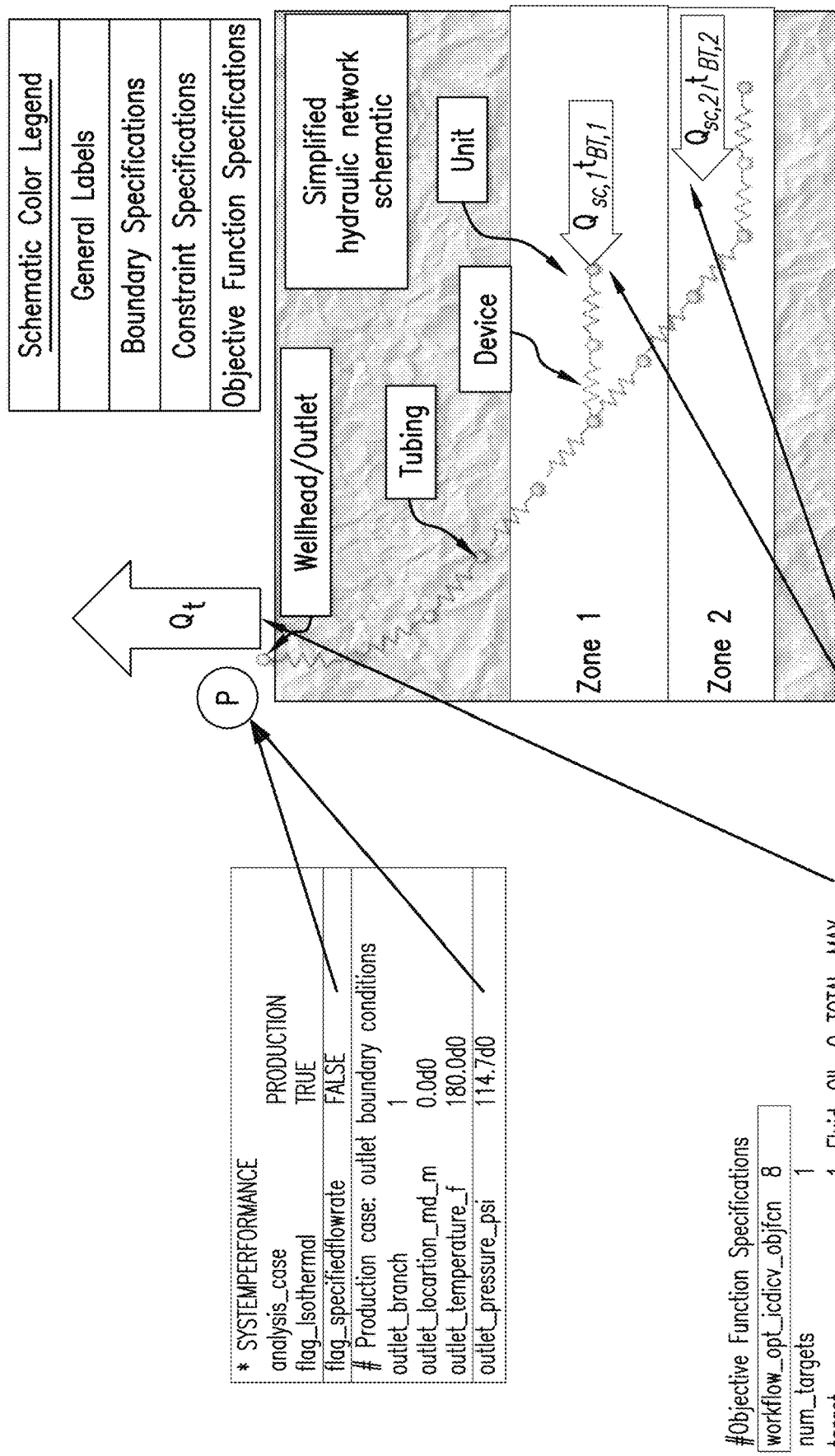

A second objective function is introduced to facilitate packer completion optimization of an unknown number of packers, and subsequently an unknown number of pseudo-units. This is similar to the first objective function except the breakthrough time constraint value is specified globally. Global specification is provided since the number of flow compartments and their defining bounds changes as the packers are moved and/or added. The second objective function my be used in an optimization method for maximizing flow rate and controlling global breakthrough time, an example of which is shown in FIG. 21.

The optimization method is similar to the method of FIG. 20, except that the constraints are defined on a system basis (as opposed to the per unit basis of the FIG. 20 method):

$$t_{BT}^m < t_{BT,target}^m.$$

Application requirements for a fully constrained system in this method include the following. Boundary conditions are valid for systems with prescribed tubing well head pressure as the boundary condition specification. Inputs include specification of the system breakthrough time constraints. FIG. 21 illustrates aspects of the optimization method inputting boundary specifications P, such as whether a specific flow rate is flagged, outlet location, outlet temperature and outlet pressure. Objective function specifications are also input, such as an objective function $Q_t$, the number and types of target values, and constraints $Q_{sc}$, $t_{BT}$ for each formation zone (Zone 1 and Zone 2).

FIGS. 22 and 23 show an example of a portion of a user interface. This interface portion may be employed by a user to select optimization parameters and constraints.

FIGS. 24-28 illustrate aspects of an embodiment of the system that includes modules and/or functionality for performing assessment of hardware reliability, input sensitivity factors, and uncertainties in input data. This embodiment provides several reliability and sensitivity analysis capabilities, including Monte Carlo sampling, Latin Hypercube sampling, Advanced Mean Value methods, Iterated Advanced Mean Value methods, and hybrid methods. Subroutines may be embedded into the Near Wellbore Simulation Methodology for performing assessments. Uncertainty analysis flow diagrams for performing the assessment are provided at FIGS. 24 and 25.

Figure 24:
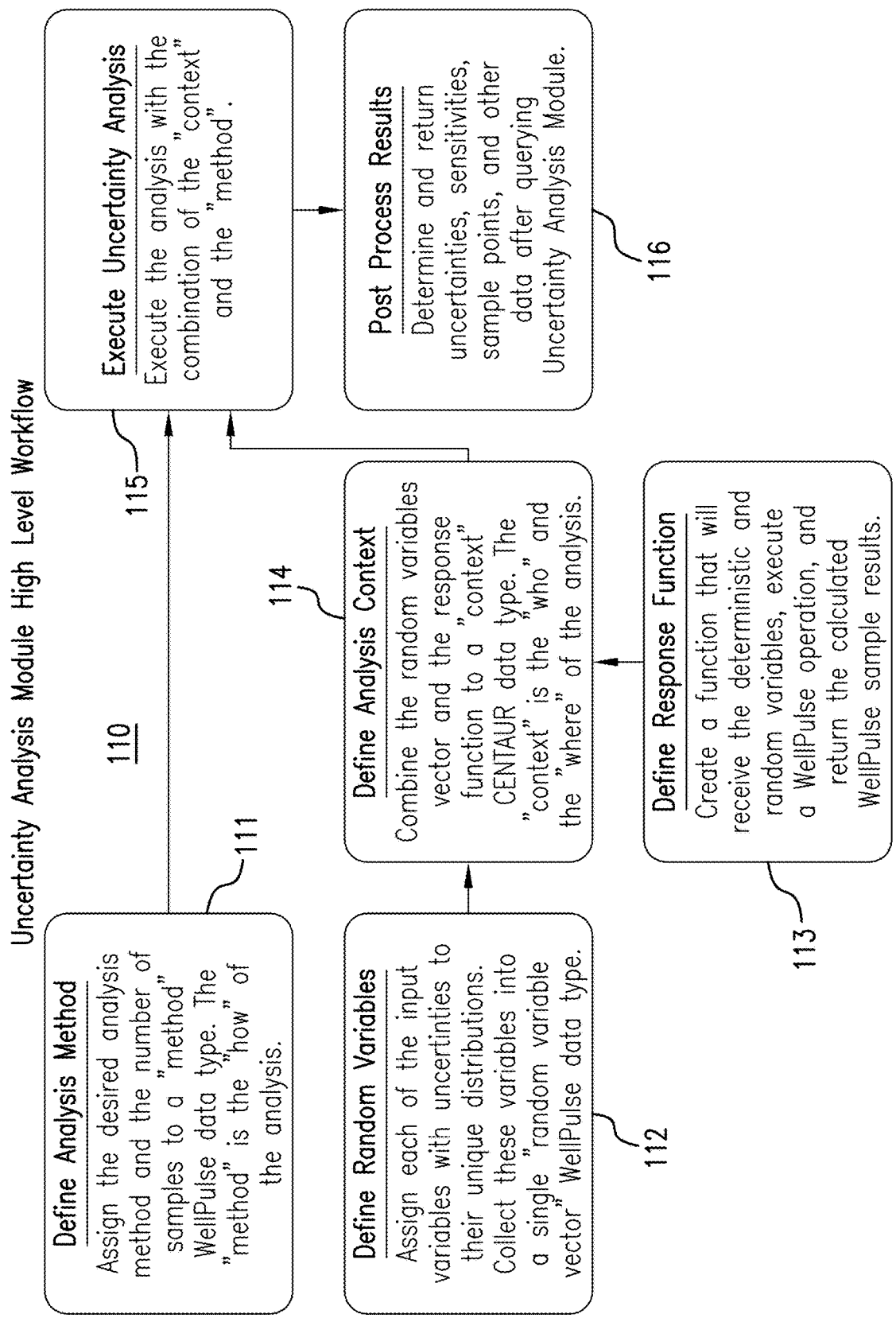
FIG. 24 depicts a flow diagram representing aspects of an uncertainty analysis.

Referring to FIG. 24, an uncertainty analysis method 110 performed by an uncertainty analysis module includes defining the type of analysis to be performed and the number of samples (e.g., taken from logging data or other measurement data), and assigning these to a data type referred to as a "method" data type (block 111), assigning input variables with uncertainties to a "random variable vector" data type (block 112), and creating a response function (block 113). At block 114, the random variable vector data and the response function are combined to a "context" data type (which may be a data type suitable for gridding software). At block 115, the uncertainty analysis is executed using the "context" and "method" data. Processing results are then generated, such as uncertainties, sensitivities and sample points (block 116).

Figure 25:
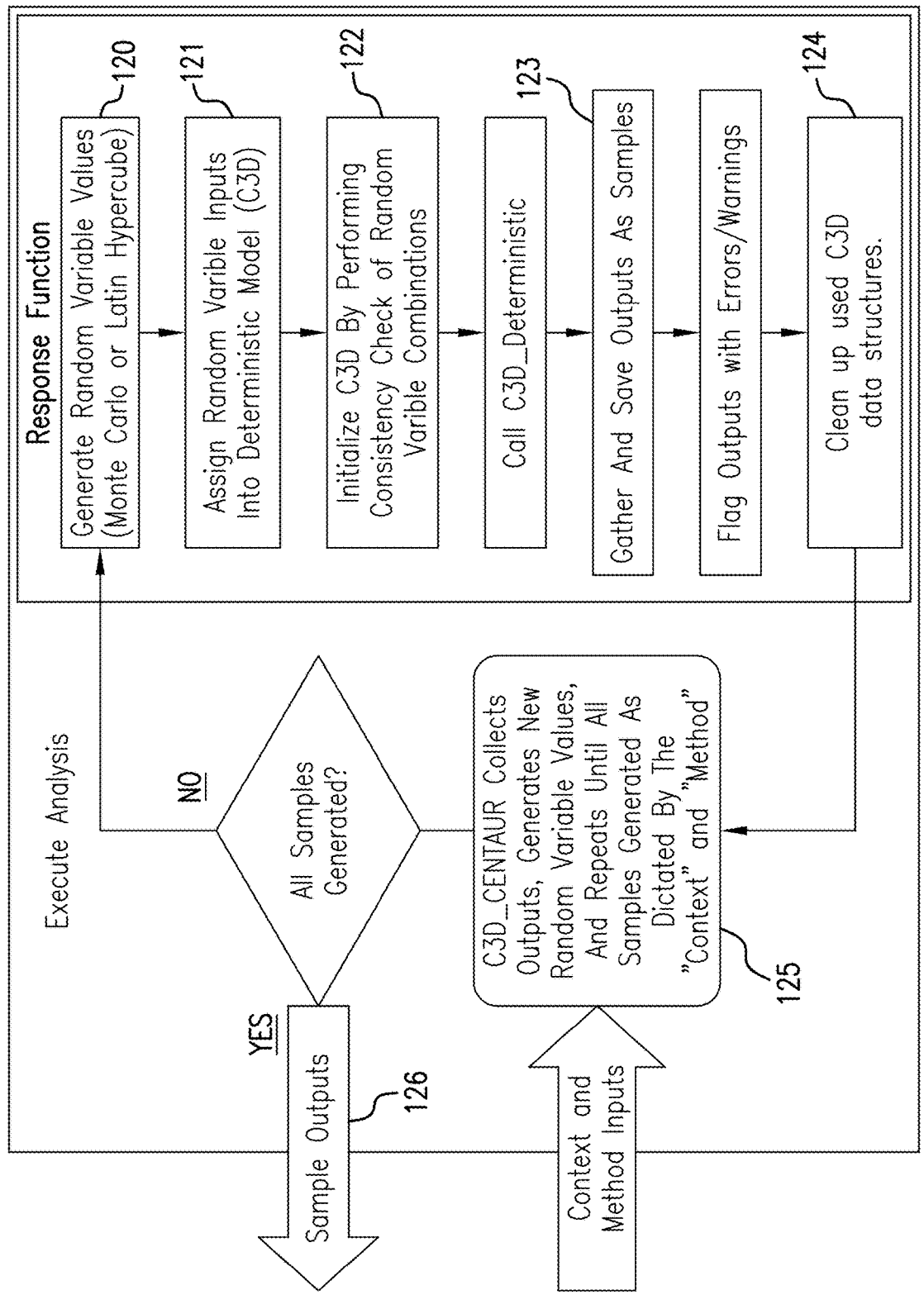
FIG. 25 depicts a flow diagram representing aspects of an uncertainty analysis.

FIG. 25 illustrates use of the response function by the uncertainty analysis module. In this example, the uncertainty analysis includes generating random variable values (block 120), assigning the random variables to a deterministic model (block 121), and initializing the model by performing consistency checks of random variable combinations (block 122). Outputs from the model are gathered and saved as samples (block 123), and samples having high errors or uncertainties are flagged (block 124). At block 125, the outputs are collected and new variable values are generated, and the steps of blocks 120-124 are repeated as dictated by the analysis type and the response function. Once all of the samples have been generated, they are output to a user or other module (block 126).

Figure 26:
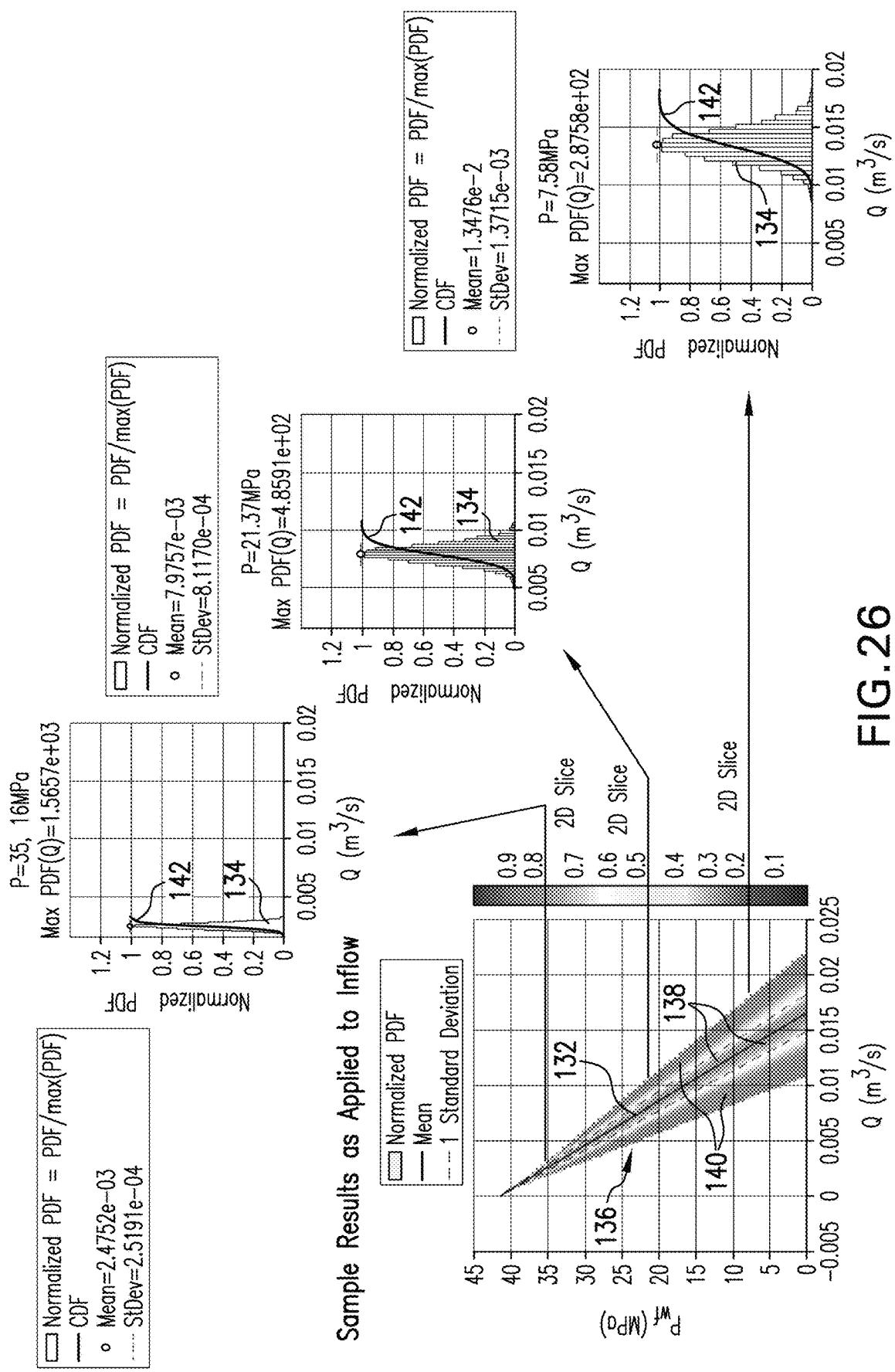
FIG. 26 depicts an example of uncertainty analysis results as applied to an inflow model.
Figure 27:
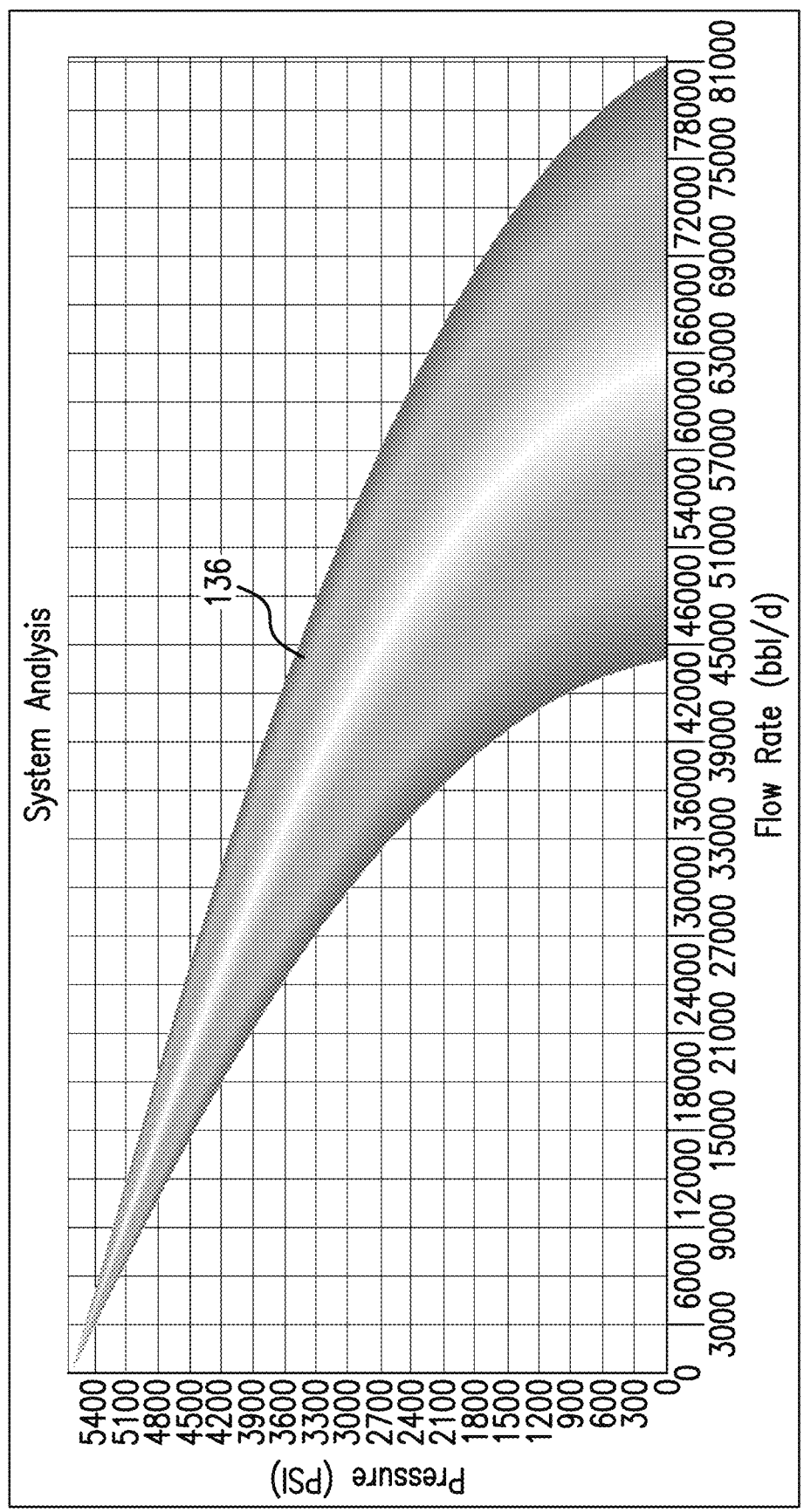
FIGS. 27 and 28 depict aspects of an example of an uncertainty analysis.
Figure 28:
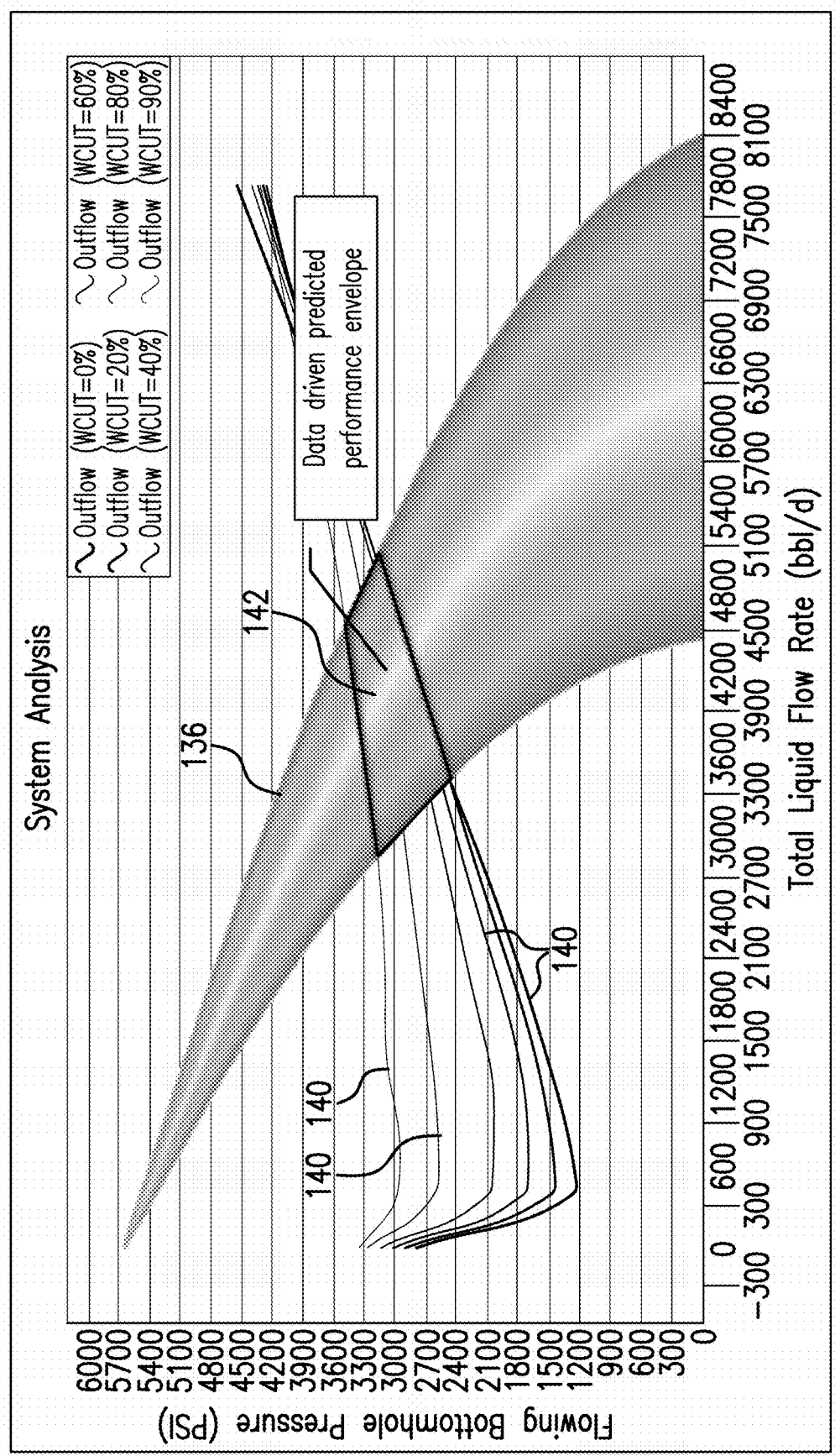
Figure 29B:
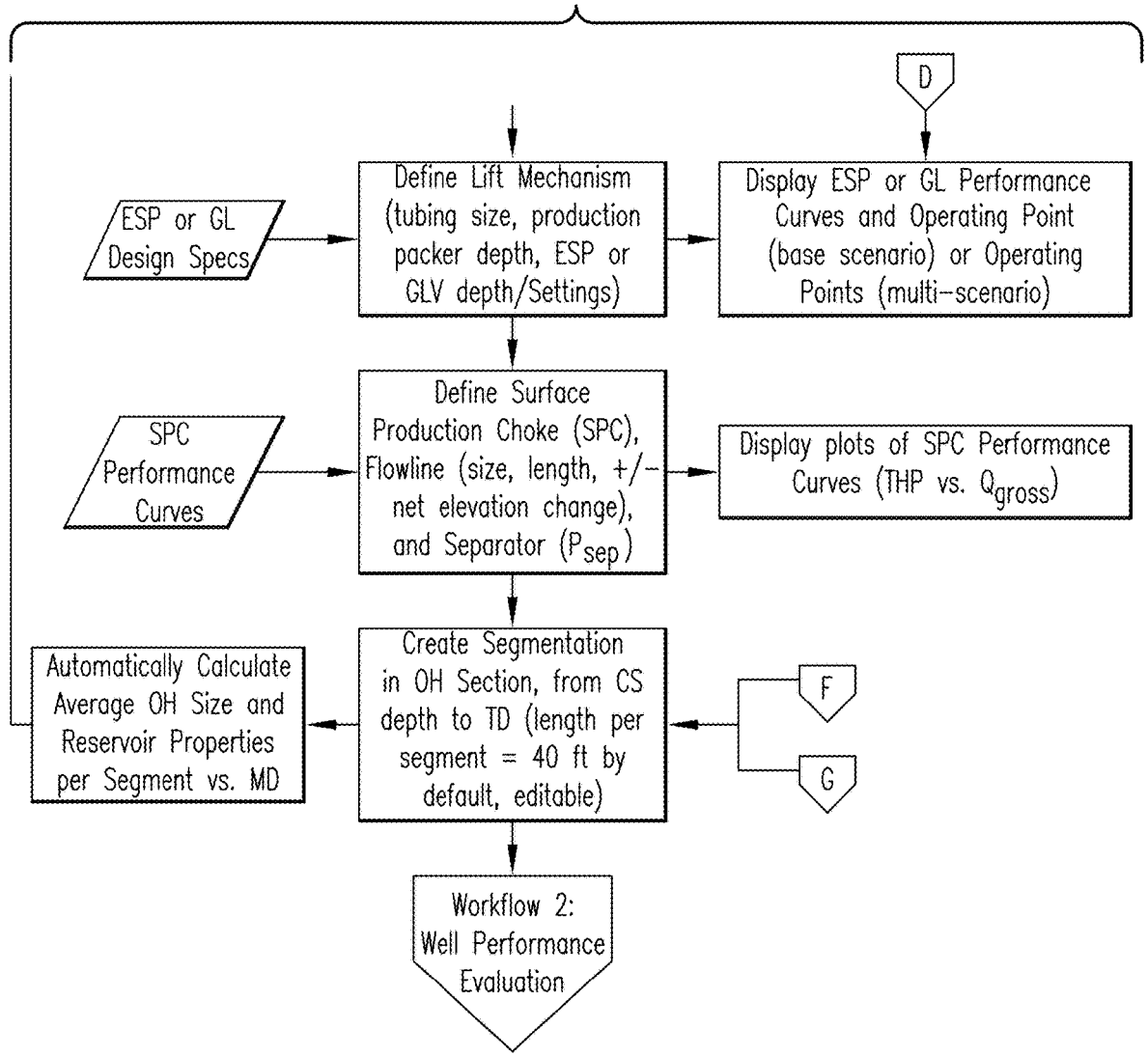
Figure 30B:
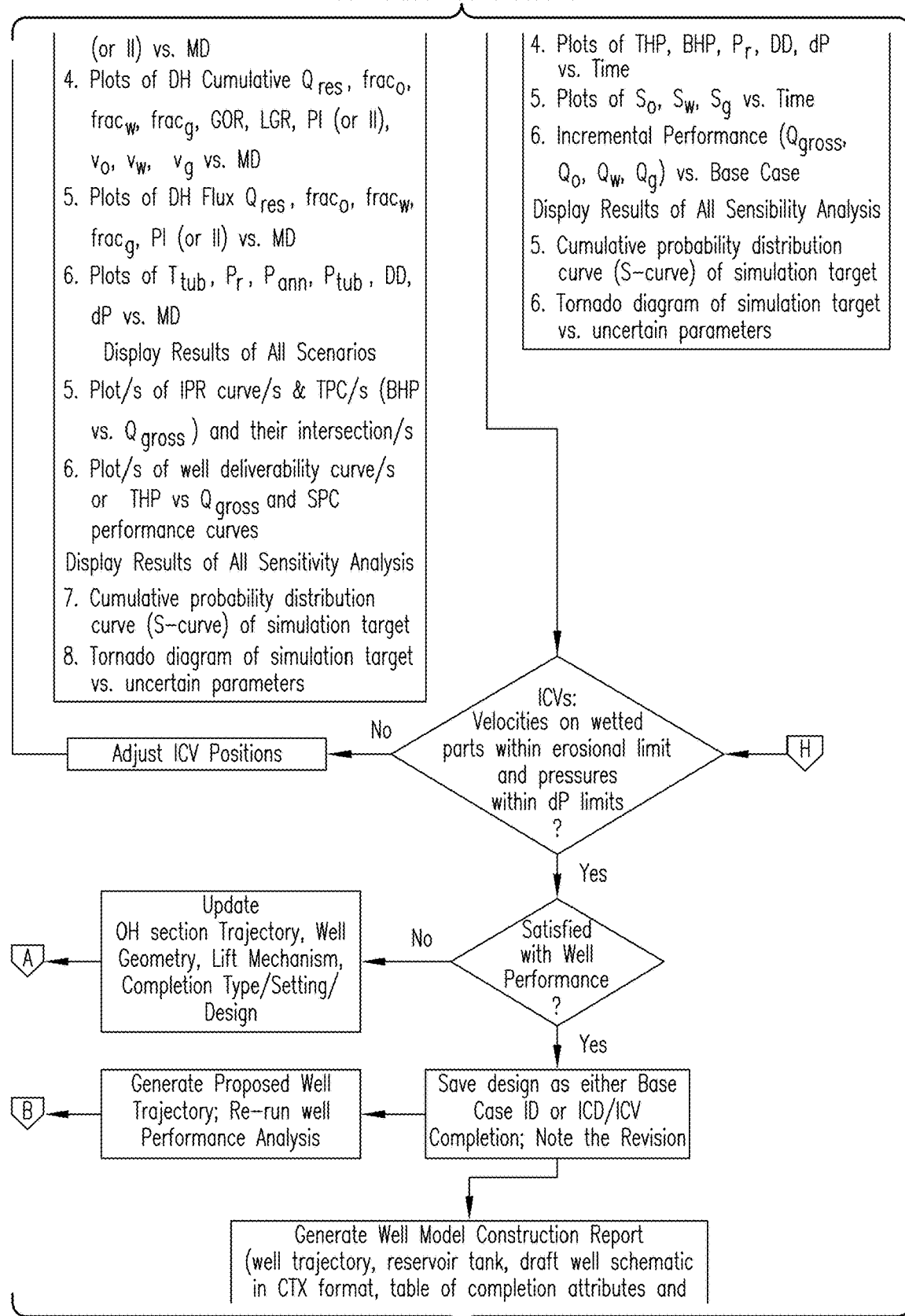
Figure 30C:
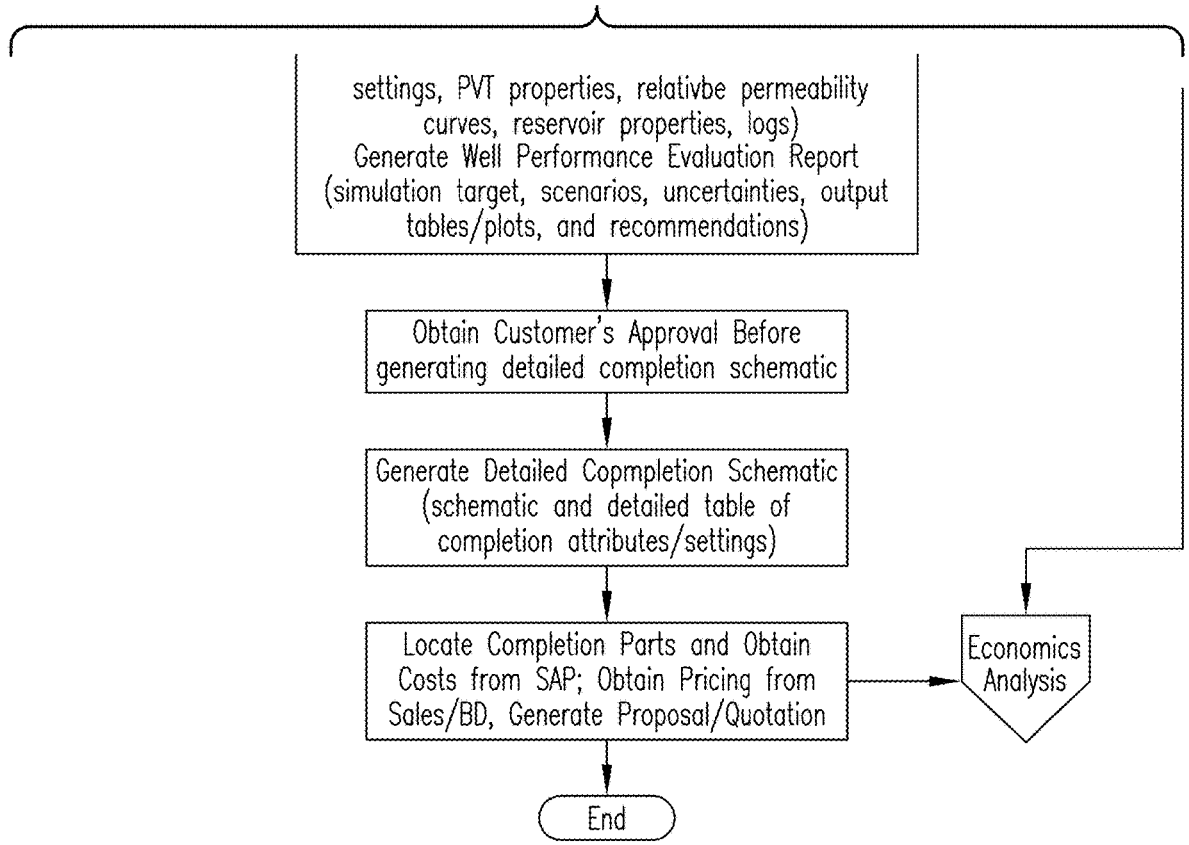
Figure 31A:
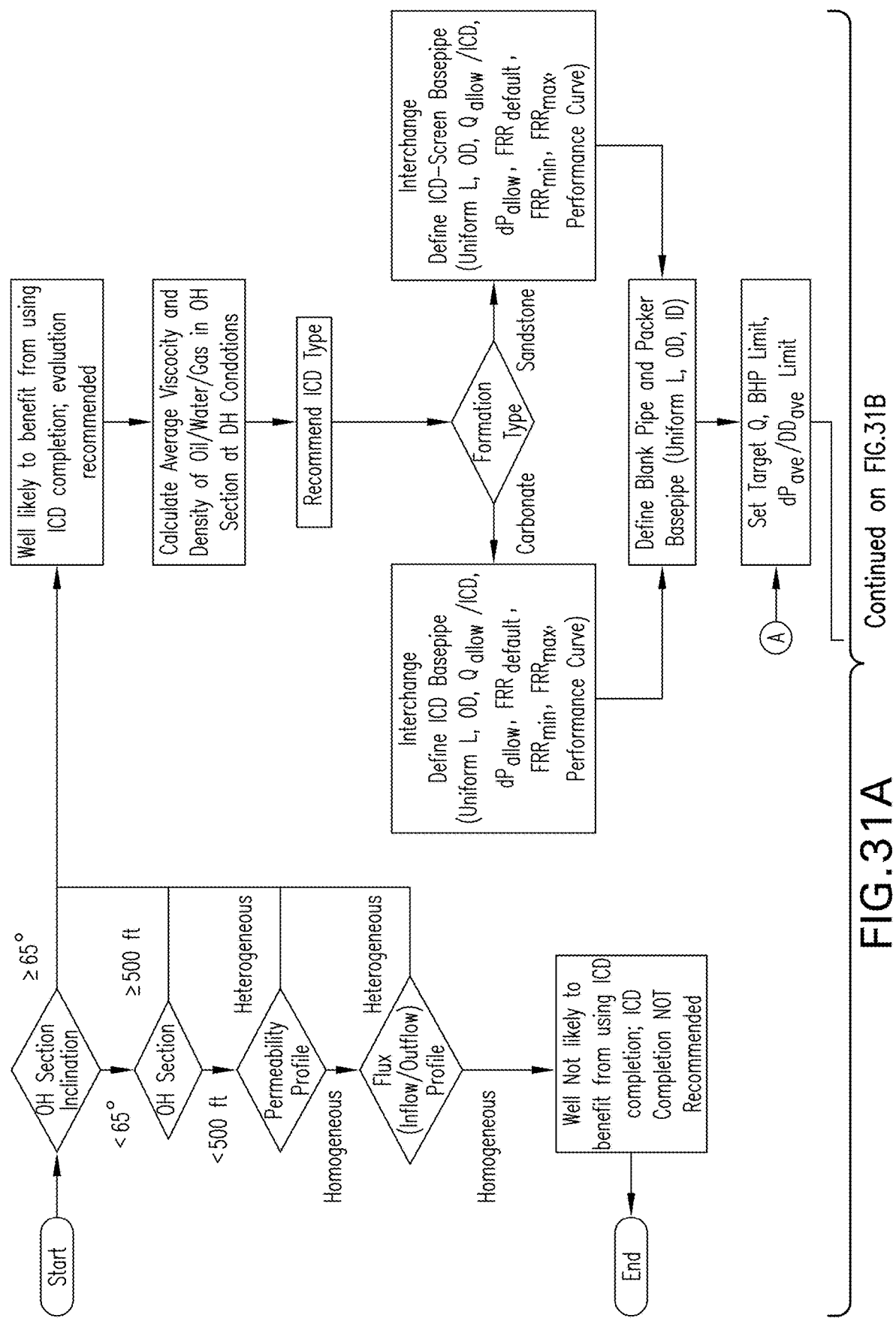
Figure 31B:
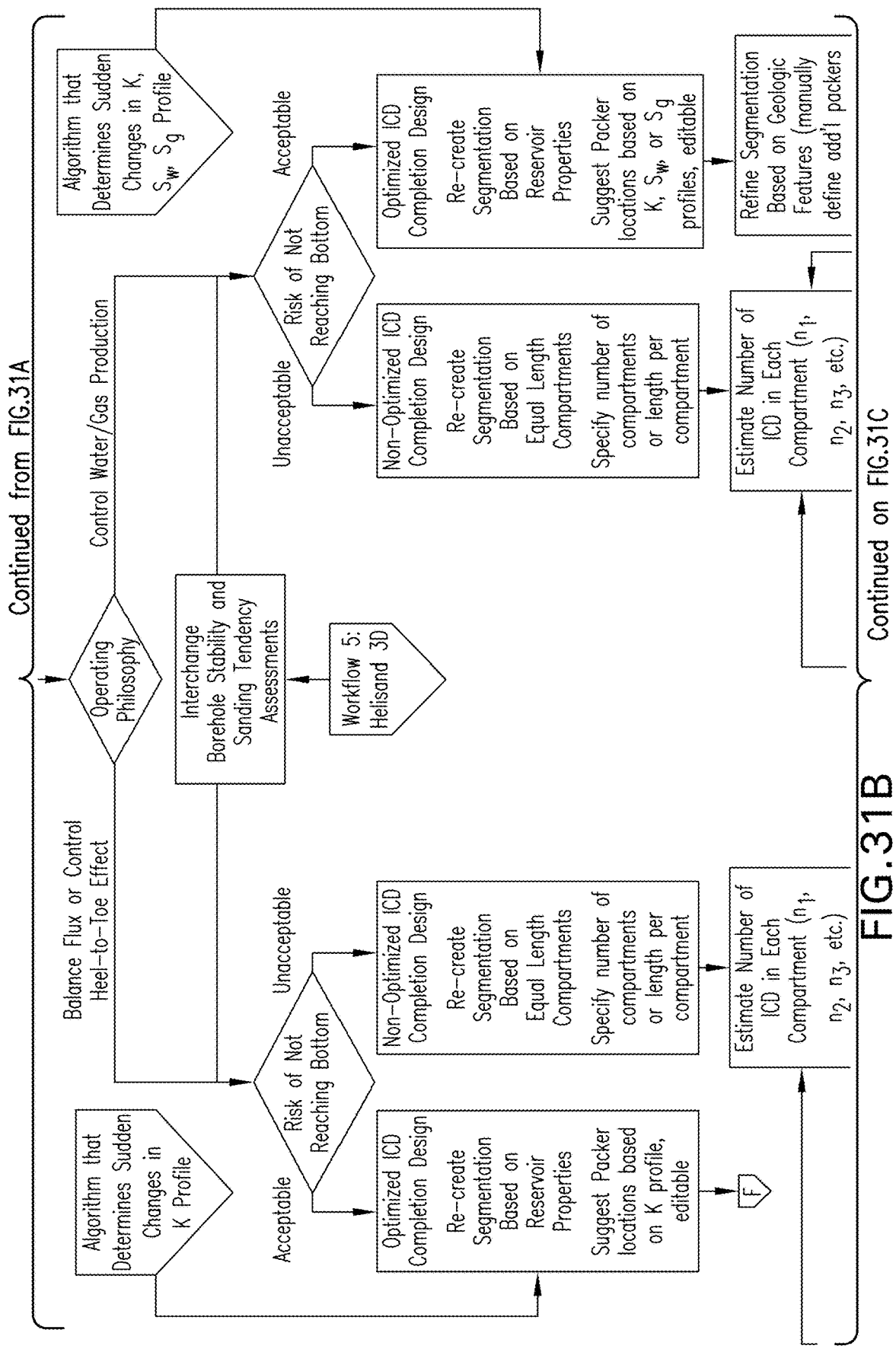
Figure 32A:
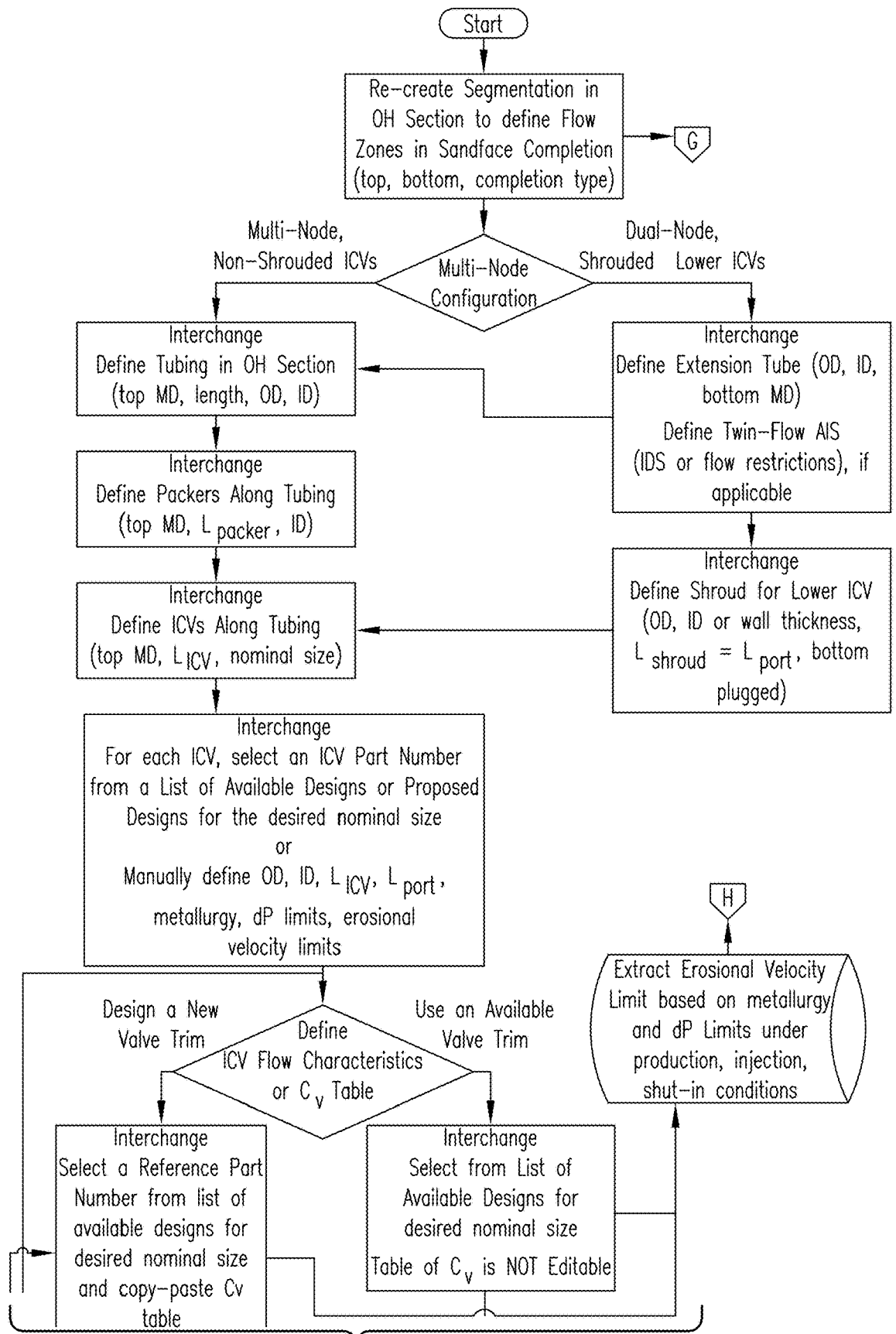
FIGS. 32A and 32B (collectively referred to as "FIG. 32") depict examples of workflows for performing simulation, modeling and component design optimization.
Figure 32B:
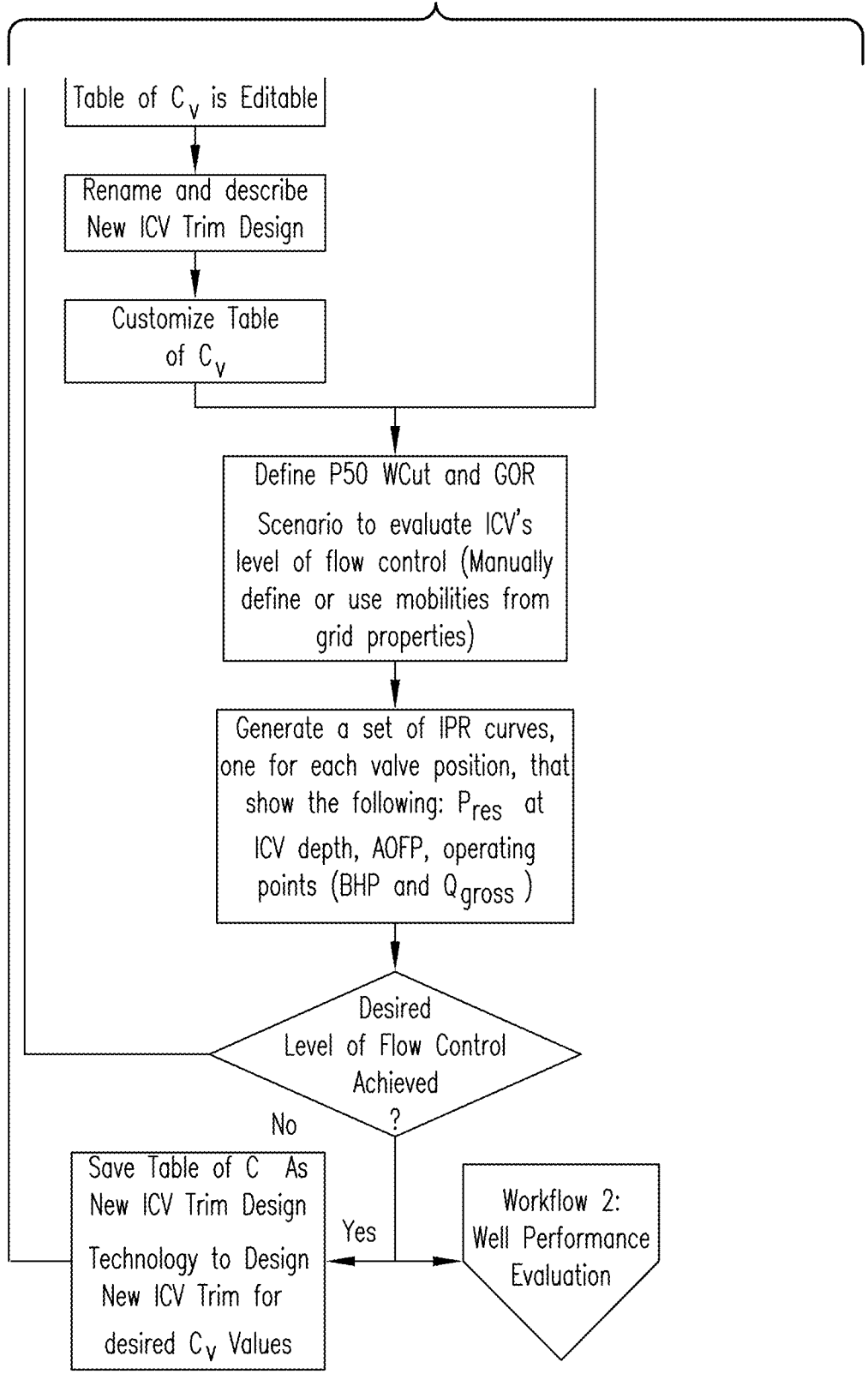

FIGS. 26-28 illustrate results of the assessment in the form of uncertainty ranges shown as performance envelopes.

For example, FIG. 26 shows the probability of the flow rate as a function of pressure given the uncertainty in permeability. This was obtained by generating 5000 Monte-Carlo samples at each pressure step in an original IPR (inflow performance relationship) analysis (61 pressures). The probability results are shown in a graph 130 that includes a mean flow rate vs. pressure curve 132, which is calculated based on a probability distribution function (PDF) 134 at various two-dimensional slices. The mean curve 132 is calculated by calculating the mean of each PDF, and an uncertainty plot 136 is calculated that includes color-coded probabilities. The probabilities are color-coded: red (shown as regions 138) is most probable and blue (shown as regions 140) is least probable at each individual constant pressure value. The 2D slices show the PDF 134 at any individual pressure (Pwf), as well as a cumulative distribution function (CDF) 142. The scale is kept constant to show the variable spread in the flow rate at different Pwf.

FIGS. 27 and 28 show an example of the uncertainty plot 136 generated for total liquid flow rate (in barrels per day or bbl/d) as a function of bottomhole pressure. For a multiple zone well, the uncertainty plot 136 may be generated on a per-zone basis (i.e., fluid flow rate from a zone vs pressure in the zone). As shown in FIG. 28, outflow rates for different water cuts are calculated using, e.g., the near wellbore simulation, to define a range of outflow values as a function of pressure, shown as a series of curves 140. The outflow rate ranges are compared to the probability data to generate a predicted performance envelope 142 that represents the intersection between the uncertainty plot 86 and an uncertainty range or plot for another parameter. In this example, the other parameter is outflow, although any suitable combination of parameters may be used to generate the uncertainty plot and the performance envelope. The performance envelope provides a model match area that accounts for data and modeling uncertainties.

FIGS. 29-32 illustrate additional examples of workflows that may be generated by the system. The workflows are denoted as Workflow 1 through Workflow 4, which may operate in conjunction and include interchanges as illustrated. In the example workflow of FIG. 32, the following premises may be employed:

A library of available ICV design should be available in a drop drown menu. Each ICV listed should have the nominal size and description.

As a completion component, an ICV is represented as a short piece of pipe with ID, ODICV, LICV.

The location of tungsten carbide trim (port) along LICV is specified as some distance, Lport, from the bottom.

The port is represented as a point, i.e. very short length (~1 ft).

The ICV position, which determines the port size, should be manually specified.

The bottom is always open to flow by default. If the ICV is shrouded, the bottom is automatically plugged.

Attributes of shroud: OD and ID or wall thickness should be specified while length equals Lport.

Metallurgies and corresponding erosional velocity limits (e.g. API RP 14E C Factor) should be specified for erosional flowrate calculations.

For each ICV, a set of IPR curves will be generated, one for each valve position, that show the following: Pres at ICV depth, OFP, operating points (BHP and Qgross).

Pres, BHP, THP, Qgross, % Qgross, Qo, Qw, Qres, WCut, GOR, dP, should be shown as points in Cumulative and Flux plots vs. MD.

The following acronyms and abbreviations are used in the workflows of FIGS. 29-32 and/or the above descriptions:
AIS: absolute isolation system
AOFP: absolute open flow potential
B: formation volume factor (gas, oil, water)
BD: business development
BHP: bottom hole pressure
BP: blank pipe
BUP: build-up pressure
CL: cemented liner
CS: casing shoe
Cv: flow coefficient
DD: drawdown DDave: average drawdown
DH: downhole
dP: pressure drop across completion
dPallow max: allowable pressure drop across ICD
dPave: average pressure drop across completion
dPmax: maximum pressure drop across completion
dPmin: minimum pressure drop across completion
ESP: electric submersible pump
frac inflow volume fraction (gas, oil, water)
FRRdefault: default flow resistance setting of ICD
FRRmax: maximum flow resistance setting of ICD
FRRmin: minimum flow resistance setting of ICD
GL: gas lift
GLV: gas lift valve
GOC: gas-oil contact
GOR: gas-to-oil ratio
GP: gravel pack
ICD: inflow control device
ICV: interval control valve
ID: internal diameter
II: injectivity index (gas, oil, water)
IPR: inflow performance relationship
K: permeability
L: length (packer, ICV, shroud, OH)
Lport: distance of port from bottom of ICV
MD: measured depth
ni: number of ICDs in each compartment
OD: outside diameter
OH: open hole
P50: most likely scenario
Pann: annular pressure
PCL: perforated cemented liner
PI: productivity index (gas, oil, water)
PL: perforated liner
Pr: reservoir pressure
Psep: separator pressure
Ptub: tubing pressure
PVT: pressure-volume-temperature
Q: flow rate (gas, oil, water)
Qallow: maximum allowable rate
Qgross: gross rate
Qmax: maximum rate
Qmin: minimum rate
Qres: flow rate at reservoir condition
Rs: dissolved gas-oil ratio
s: skin factor
S: saturation (gas, oil, water)
SAS: stand-alone screen
SL: slotted liner
SPC: surface production choke
STD: standard conditions
TD: total depth
THP: tubing head pressure
TPC: tubing performance curve
Tr: reservoir temperature
Ttub: tubing temperature
v: velocity (gas, oil, water)
WCut: water cut
WOC: water-oil contact
Z: gas compressibility factor
Φ: porosity
ρ: density
μ: viscosity Embodiments described herein provide numerous advantages. For example, the embodiments provide reservoir development and production management tools that allow data to be processed via integrated workflows and analyzed more rigorously across the classical discipline boundaries to ensure effective exploitation of the reservoir's resources throughout its lifecycle. The embodiments also present solutions that deliver high performance wells and completions that yield the predicted recoveries per well and well production rates so that well count can be reduced, reliable wells and completions to avoid incurring the high cost of intervention, and robust reservoir management and flow assurance solutions consistent with the complexities of subsea development and operations that provide flexibility to respond to production uncertainties. Additional advantages include:

Integrated, Configurable Workflows
Integration of legacy and new software applications
Vendor neutral platform—flexibility for client preferences
Collaborative User Environment/Interactive Interface
Rapid access to and assimilation of Well Completion & Production Data
Support variety of End user Environments
Tablets/Desk Top-Stand-Alone/Client Server-Networked Cluster Set forth below are some embodiments of the foregoing disclosure:

Embodiment 1

A method of performing aspects of an energy industry operation, the method comprising: receiving input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation; based on the input data, generating a workflow that includes steps for estimating production properties using the models; receiving a selection from a user specifying at least one of a type of analysis to be performed and a level of complexity of analysis to be performed; customizing the workflow based on the user selection; estimating the production properties based on the models, wherein estimating is performed according to a procedure specified by the workflow; and adjusting at least one of an operational parameter of the energy industry operation and a design parameter of the downhole component based on the production properties.

Embodiment 2

The method of any prior embodiment, wherein the workflow is an integrated workflow that includes procedures for estimating both downhole component designs and simulating production.

Embodiment 3

The method of any prior embodiment, wherein the production properties include production properties of at least one of: one or more inflow control valves and one or more inflow control devices.

Embodiment 4

The method of any prior embodiment, wherein the one or more models include at least one of an analytical flow model and a plurality of numerical flow models having different levels of complexity.

Embodiment 5

The method of any prior embodiment, wherein the numerical flow model includes a near wellbore solver for modeling flow in an immediate vicinity of the borehole, an extended grid solver for modeling a region of the formation outside of the immediate vicinity, and a backbone solver configured to model flow within the borehole.

Embodiment 6

The method of any prior embodiment, wherein the selection from the user specifies one or more of the analytical flow model and the plurality of numerical flow models, and customizing includes incorporating procedure steps for simulating fluid flow based on the specified models.

Embodiment 7

The method of any prior embodiment, wherein the one or more models include a plurality of downhole component design models, each of the plurality of downhole component design models having a different level of complexity.

Embodiment 8

The method of any prior embodiment, wherein the selection from the user specifies one or more of the plurality of downhole component design models, and customizing includes incorporating procedure steps for evaluating the downhole component based on the specified models.

Embodiment 9

The method of any prior embodiment, wherein the model of the downhole component includes a model of a completion design, and estimating the production properties includes performing an optimization method that includes determining optimal design features based on one of a plurality of optimization objectives.

Embodiment 10

The method of any prior embodiment, wherein the selection from the user specifies one of the plurality of optimization objectives, and estimating the production properties includes performing the optimization method based on the selected optimization objective.

Embodiment 11

A system for performing aspects of an energy industry operation, the system comprising: an input module configured to receive input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation; an analysis module configured to generating a workflow based on the input data, the workflow including steps for estimating production properties using the models, the analysis module configured to receive a selection from a user specifying at least one of a type of analysis to be performed and a level of complexity of analysis to be performed, and customize the workflow based on the user selection; and a simulation module configured to estimate the production properties based on the models, wherein estimating is performed according to a procedure specified by the workflow.

Embodiment 12

The system of any prior embodiment, further comprising a control module configured to adjust at least one of an operational parameter of the energy industry operation and a design parameter of the downhole component based on the production properties.

Embodiment 13

The system of any prior embodiment, wherein the workflow is an integrated workflow that includes procedures for estimating both downhole component designs and simulating production.

Embodiment 14

The system of any prior embodiment, wherein the one or more models include at least one of an analytical flow model and a plurality of numerical flow models having different levels of complexity.

Embodiment 15

The system of any prior embodiment, wherein the analysis module includes a near wellbore solver for modeling flow in an immediate vicinity of the borehole, an extended grid solver for modeling a region of the formation outside of the immediate vicinity, and a backbone solver configured to model flow within the borehole.

Embodiment 16

The system of any prior embodiment, wherein the selection from the user specifies one or more of the analytical flow model and the plurality of numerical flow models, and the analysis module is configured to customize the workflow by incorporating procedure steps for simulating fluid flow based on the specified models.

Embodiment 17

The system of any prior embodiment, wherein the one or more models include a plurality of downhole component design models, each of the plurality of downhole component design models having a different level of complexity.

Embodiment 18

The system of any prior embodiment, wherein the selection from the user specifies one or more of the plurality of downhole component design models, and the analysis module is configured to customize the workflow by incorporating procedure steps for evaluating the downhole component based on the specified models.

Embodiment 19

The system of any prior embodiment, wherein the model of the downhole component includes a model of a completion design, and the analysis module is configured to perform an optimization method that includes determining optimal design features based on one of a plurality of optimization objectives.

Embodiment 20

The system of any prior embodiment, wherein the selection from the user specifies one of the plurality of optimization objectives, and the analysis module is configured to perform the optimization method based on the selected optimization objective.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of performing aspects of an energy industry operation, the method comprising:

receiving input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation;

based on the input data, generating an overall workflow that includes steps for estimating production properties using the models, the overall workflow specifying a plurality of types of analyses, each type of analysis having a different level of complexity, the overall workflow specifying a subsidiary workflow for each level of complexity, each subsidiary workflow including a set of models and configured to guide a user through processes associated with the set of models;

presenting a user interface to a user, the user interface displaying the overall workflow and each subsidiary workflow, the user interface displaying a plurality of selectable options, the plurality of selectable options including the types of analyses having the different levels of complexity;

receiving a selection from a user, the selection specifying a type of analysis to be performed, the specified type of analysis corresponding to a level of complexity;

selecting the set of models corresponding to the specified type of analysis;

estimating the production properties based on the selected set of models, wherein estimating is performed according to a procedure specified by the workflow; and adjusting an operational parameter of the energy industry operation based on the production properties.

2. The method of claim 1, wherein the overall workflow is an integrated workflow that includes procedures for estimating both downhole component designs and simulating production.

3. The method of claim 1, wherein the production properties include production properties of at least one of: one or more inflow control valves and one or more inflow control devices.

4. The method of claim 1, wherein the one or more models include at least one of an analytical flow model and a plurality of numerical flow models having different levels of complexity.

5. The method of claim 4, wherein the numerical flow model includes a near wellbore solver for modeling flow in an immediate vicinity of the borehole, an extended grid solver for modeling a region of the formation outside of the immediate vicinity, and a backbone solver configured to model flow within the borehole.

6. The method of claim 4, wherein the selection from the user specifies one or more of the analytical flow model and the plurality of numerical flow models, and customizing includes incorporating procedure steps for simulating fluid flow based on the specified models.

7. The method of claim 1, wherein the one or more models include a plurality of downhole component design models, each of the plurality of downhole component design models having a different level of complexity.

8. The method of claim 7, wherein the selection from the user specifies one or more of the plurality of downhole component design models, and customizing includes incorporating procedure steps for evaluating the downhole component based on the specified models.

9. The method of claim 1, wherein the model of the downhole component includes a model of a completion design, and estimating the production properties includes performing an optimization method that includes determining optimal design features based on one of a plurality of optimization objectives.

10. The method of claim 9, wherein the selection from the user specifies one of the plurality of optimization objectives, and estimating the production properties includes performing the optimization method based on the selected optimization objective.

11. A system for performing aspects of an energy industry operation, the system comprising:
an input module configured to receive input data from a user at a processing system, the input data describing an assembly for performing the energy industry operation and properties of the formation, the assembly including a downhole component configured to be disposed in a borehole in an earth formation, the processing system configured to estimate production properties based on mathematical models including at least a model of the downhole component and one or more models for simulating fluid flow in the formation;
an analysis module including a processor programmed to generate an overall workflow based on the input data, the overall workflow including steps for estimating production properties using the models, the overall workflow specifying a plurality of types of analyses, each type of analysis having a different level of complexity, the overall workflow specifying a subsidiary workflow for each level of complexity, each subsidiary workflow including a set of models and configured to guide a user through processes associated with the set of models;
the analysis module configured to present a user interface to a user, the user interface displaying the overall workflow and each subsidiary workflow, the user interface displaying a plurality of selectable options, the plurality of selectable options including the types of analyses having the different levels of complexity, the analysis module configured to receive a selection from a user, the selection specifying a type of analysis to be performed, the specified type of analysis corresponding to a level of complexity of analysis to be performed, the analysis module configured to select the set of models corresponding to the specified type of analysis; and
a simulation module including a processor programmed to solve the selected set of models to estimate the production properties based on the models, wherein estimating is performed according to a procedure specified by the-workflow; and
a control module including a processing unit programmed to adjust an operational parameter of the energy industry operation based on the production properties.

12. The system of claim 11, wherein the overall workflow is an integrated workflow that includes procedures for estimating both downhole component designs and simulating production.

13. The system of claim 11, wherein the one or more models include at least one of an analytical flow model and a plurality of numerical flow models having different levels of complexity.

14. The system of claim 13, wherein the analysis module includes a near wellbore solver for modeling flow in an immediate vicinity of the borehole, an extended grid solver for modeling a region of the formation outside of the immediate vicinity, and a multi-phase flow simulator configured to model flow within the borehole.

15. The system of claim 13, wherein the selection from the user specifies one or more of the analytical flow model and the plurality of numerical flow models, and the analysis module is configured to customize the workflow by incorporating procedure steps for simulating fluid flow based on the specified models.

16. The system of claim 11, wherein the one or more models include a plurality of downhole component design models, each of the plurality of downhole component design models having a different level of complexity.

17. The system of claim 16, wherein the selection from the user specifies one or more of the plurality of downhole component design models, and the analysis module is configured to customize the workflow by incorporating procedure steps for evaluating the downhole component based on the specified models.

18. The system of claim 1, wherein the model of the downhole component includes a model of a completion design, and the analysis module is configured to perform an optimization method that includes determining optimal design features based on one of a plurality of optimization objectives.

19. The system of claim 18, wherein the selection from the user specifies one of the plurality of optimization objectives, and the analysis module is configured to perform the optimization method based on the selected optimization objective.

* * * * *